United States Patent
Hassan et al.

(10) Patent No.: US 8,374,130 B2
(45) Date of Patent: Feb. 12, 2013

(54) ORTHOGONAL FREQUENCY DIVISION MULTIPLE ACCESS WITH CARRIER SENSE

(75) Inventors: Amer A. Hassan, Kirkland, WA (US); Adam Sapek, Redmond, WA (US); Hui Shen, Sammamish, WA (US); Thomas W. Kuehnel, Seattle, WA (US); Deyun Wu, Sammamish, WA (US); Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 12/020,212

(22) Filed: Jan. 25, 2008

(65) Prior Publication Data

US 2009/0190535 A1 Jul. 30, 2009

(51) Int. Cl.
*H04Q 7/00* (2006.01)
*H04J 1/00* (2006.01)
*H04B 7/208* (2006.01)

(52) U.S. Cl. ........ 370/329; 370/343; 370/344; 370/437; 370/465; 370/468; 370/480

(58) Field of Classification Search ........................ None
See application file for complete search history.

(56) References Cited

U.S. PATENT DOCUMENTS

| | | | |
|---|---|---|---|
| 3,343,093 | A | 9/1967 | Gerwen |
| 4,210,780 | A | 7/1980 | Hopkins et al. |
| 5,504,775 | A | 4/1996 | Chouly et al. |
| 5,729,535 | A | 3/1998 | Rostoker |
| 5,790,516 | A | 8/1998 | Gudmundson et al. |
| 5,867,478 | A | 2/1999 | Baum et al. |
| 6,175,550 | B1 | 1/2001 | Van Nee |
| 6,295,272 | B1 | 9/2001 | Feldman |

(Continued)

FOREIGN PATENT DOCUMENTS

| CN | 1468486 | 4/2004 |
|---|---|---|
| CN | 1723676 | 1/2006 |

(Continued)

OTHER PUBLICATIONS

"Orthogonal Frequency Division Multiple Access," Wikipedia Online Encyclopedia; retrieved from http://en.wikipedia.org/wiki/ofdma, published Nov. 25, 2006, downloaded on Dec. 12, 2006, pp. 1-3.

(Continued)

*Primary Examiner* — Nittaya Juntima
*Assistant Examiner* — Christine Duong
(74) *Attorney, Agent, or Firm* — L. Alan Collins; Collins & Collins Intellectual, LLC

(57) ABSTRACT

A communication system in which an access point and one or more devices communicating through the access point adaptively apply Orthogonal Frequency Division Multiple Access (OFDMA). The access point may assign orthogonal subcarriers to devices as in conventional OFDMA, but the access point senses activity on the subcarriers and selects subcarriers without activity for assignment. In an alternative approach, a device that is configured for OFDMA communication may receive a channel assignment from a device that does not support OFDMA. The OFDMA-capable device may use only a portion of the subcarriers in the assigned channel, which may be communicated to the non-OFDMA device. During the non-OFDMA device may then ignore unused subcarriers in error detection and correction to avoid incorrectly classifying communications as erroneous. Information about OFDMA capabilities, subcarrier assignments and subcarriers in use may be communicated as information elements in network control communications, such as beacons and probe messages.

19 Claims, 9 Drawing Sheets

U.S. PATENT DOCUMENTS

| | | |
|---|---|---|
| 6,304,611 B1 | 10/2001 | Miyashita et al. |
| 6,456,653 B1 | 9/2002 | Sayeed |
| 6,553,534 B2 | 4/2003 | Yonge et al. |
| 6,609,039 B1 | 8/2003 | Schoen |
| 6,654,431 B1 | 11/2003 | Barton et al. |
| 6,704,572 B1 | 3/2004 | Whinnett |
| 6,721,267 B2 | 4/2004 | Hiben |
| 6,726,297 B1 | 4/2004 | Uesugi |
| 6,728,551 B2 | 4/2004 | Chang |
| 6,763,072 B1 | 7/2004 | Matsui et al. |
| 6,810,006 B2 | 10/2004 | Michon et al. |
| 6,870,808 B1 | 3/2005 | Liu et al. |
| 6,882,851 B2 | 4/2005 | Sugar et al. |
| 6,904,283 B2 | 6/2005 | Li et al. |
| 6,934,246 B2 | 8/2005 | Park |
| 6,934,340 B1 | 8/2005 | Dollard |
| 6,952,454 B1 | 10/2005 | Jalali et al. |
| 6,961,388 B2 | 11/2005 | Ling et al. |
| 6,976,202 B1 | 12/2005 | Rezvani et al. |
| 6,987,729 B1 | 1/2006 | Gopalakrishnan et al. |
| 7,012,883 B2 | 3/2006 | Jalali et al. |
| 7,020,071 B2 | 3/2006 | Mujtaba |
| 7,020,073 B2 | 3/2006 | Kadous et al. |
| 7,035,201 B2 | 4/2006 | Fu |
| 7,043,023 B2 | 5/2006 | Watanabe et al. |
| 7,043,681 B2 | 5/2006 | Kroeger et al. |
| 7,047,032 B2 | 5/2006 | Yun |
| 7,072,413 B2 | 7/2006 | Walton et al. |
| 7,075,967 B2 | 7/2006 | Struhsaker et al. |
| 7,076,246 B2 | 7/2006 | Chitrapu |
| 7,126,984 B2 | 10/2006 | Wang |
| 7,133,471 B2 | 11/2006 | Feher |
| 7,151,925 B2 | 12/2006 | Ting et al. |
| 7,164,649 B2 | 1/2007 | Walton et al. |
| 7,206,350 B2 | 4/2007 | Korobkov et al. |
| 7,206,840 B2 * | 4/2007 | Choi et al. ............ 709/225 |
| 7,551,641 B2 | 6/2009 | Pirzada |
| 7,672,381 B1 | 3/2010 | Kleider |
| 7,800,541 B2 | 9/2010 | Moshfeghi |
| 7,929,623 B2 | 4/2011 | Hassan |
| 7,933,344 B2 | 4/2011 | Hassan |
| 7,970,085 B2 | 6/2011 | Hassan |
| 8,144,793 B2 | 3/2012 | Hassan |
| 2002/0031189 A1 | 3/2002 | Hiben |
| 2002/0119781 A1 * | 8/2002 | Li et al. ............ 455/450 |
| 2002/0141446 A1 | 10/2002 | Koga |
| 2002/0157058 A1 | 10/2002 | Ariel |
| 2002/0188723 A1 | 12/2002 | Choi et al. |
| 2003/0015423 A1 | 1/2003 | LaGreca |
| 2003/0026200 A1 | 2/2003 | Fu et al. |
| 2003/0058786 A1 | 3/2003 | Sato et al. |
| 2003/0067961 A1 | 4/2003 | Hudson |
| 2003/0112880 A1 | 6/2003 | Walton |
| 2003/0123383 A1 | 7/2003 | Korobkov et al. |
| 2003/0154233 A1 | 8/2003 | Patterson |
| 2003/0223354 A1 | 12/2003 | Olszewski |
| 2004/0005010 A1 | 1/2004 | He et al. |
| 2004/0008618 A1 | 1/2004 | Shirakata et al. |
| 2004/0027997 A1 | 2/2004 | Terry et al. |
| 2004/0029575 A1 | 2/2004 | Mehta |
| 2004/0073929 A1 | 4/2004 | Morello |
| 2004/0081121 A1 | 4/2004 | Xu |
| 2004/0151108 A1 | 8/2004 | Claret et al. |
| 2004/0151109 A1 | 8/2004 | Batra et al. |
| 2004/0252775 A1 | 12/2004 | Park |
| 2004/0252781 A1 | 12/2004 | Park |
| 2005/0002325 A1 | 1/2005 | Giannakis et al. |
| 2005/0013238 A1 | 1/2005 | Hansen |
| 2005/0025039 A1 | 2/2005 | Hwang et al. |
| 2005/0027789 A1 | 2/2005 | Luo et al. |
| 2005/0047259 A1 | 3/2005 | Ahn |
| 2005/0063345 A1 | 3/2005 | Wu et al. |
| 2005/0078759 A1 | 4/2005 | Zhang |
| 2005/0085249 A1 * | 4/2005 | Goldstein et al. ........ 455/502 |
| 2005/0099937 A1 | 5/2005 | Oh et al. |
| 2005/0111462 A1 | 5/2005 | Walton et al. |
| 2005/0117661 A1 | 6/2005 | Kim |
| 2005/0129136 A1 | 6/2005 | Fujii |
| 2005/0130684 A1 | 6/2005 | Kim et al. |
| 2005/0141649 A1 | 6/2005 | Tanabe |
| 2005/0152466 A1 | 7/2005 | Maltsev et al. |
| 2005/0157670 A1 | 7/2005 | Tang et al. |
| 2005/0160428 A1 | 7/2005 | Ayachitula et al. |
| 2005/0180313 A1 * | 8/2005 | Kim et al. ............ 370/208 |
| 2005/0197132 A1 | 9/2005 | Lee et al. |
| 2005/0228850 A1 | 10/2005 | Zhu et al. |
| 2005/0237989 A1 | 10/2005 | Ahn et al. |
| 2005/0245197 A1 | 11/2005 | Kadous et al. |
| 2006/0009209 A1 | 1/2006 | Rieser et al. |
| 2006/0034382 A1 | 2/2006 | Ozluturk et al. |
| 2006/0045001 A1 | 3/2006 | Jalali |
| 2006/0046716 A1 | 3/2006 | Hofstaedter et al. |
| 2006/0056283 A1 | 3/2006 | Anikhindi |
| 2006/0063543 A1 | 3/2006 | Matoba |
| 2006/0078059 A1 | 4/2006 | Ok et al. |
| 2006/0083210 A1 | 4/2006 | Li et al. |
| 2006/0094372 A1 | 5/2006 | Ahn |
| 2006/0126493 A1 | 6/2006 | Hashem |
| 2006/0128318 A1 | 6/2006 | Agarossi et al. |
| 2006/0135075 A1 | 6/2006 | Tee et al. |
| 2006/0154691 A1 | 7/2006 | Tang et al. |
| 2006/0159120 A1 | 7/2006 | KIm |
| 2006/0171445 A1 | 8/2006 | Batra et al. |
| 2006/0176973 A1 | 8/2006 | Alamouti |
| 2006/0188003 A1 * | 8/2006 | Larsson ............ 375/130 |
| 2006/0188031 A1 | 8/2006 | Liu |
| 2006/0193295 A1 | 8/2006 | White et al. |
| 2006/0211387 A1 | 9/2006 | Pisek et al. |
| 2006/0211395 A1 | 9/2006 | Waltho |
| 2006/0250944 A1 | 11/2006 | Hong et al. |
| 2006/0269005 A1 | 11/2006 | Laroia et al. |
| 2006/0287001 A1 | 12/2006 | Budampati et al. |
| 2007/0002728 A1 | 1/2007 | Fujii |
| 2007/0009056 A1 | 1/2007 | Yeon et al. |
| 2007/0016413 A1 | 1/2007 | Seo et al. |
| 2007/0032220 A1 | 2/2007 | Feher |
| 2007/0055501 A1 | 3/2007 | Aytur et al. |
| 2007/0058583 A1 * | 3/2007 | Cho et al. ............ 370/329 |
| 2007/0078924 A1 | 4/2007 | Hassan et al. |
| 2007/0086420 A1 * | 4/2007 | Schotten et al. ............ 370/348 |
| 2007/0116137 A1 | 5/2007 | McCoy |
| 2007/0133387 A1 | 6/2007 | Arslan et al. |
| 2007/0189162 A1 | 8/2007 | Song |
| 2007/0263653 A1 | 11/2007 | Hassan |
| 2008/0057869 A1 | 3/2008 | Strong |
| 2008/0232340 A1 | 9/2008 | Wan et al. |
| 2008/0232490 A1 * | 9/2008 | Gross et al. ............ 375/260 |
| 2009/0086706 A1 * | 4/2009 | Huang et al. ............ 370/349 |
| 2009/0109914 A1 * | 4/2009 | McBeath et al. ............ 370/329 |
| 2009/0262849 A1 | 10/2009 | Jo |
| 2010/0040167 A1 | 2/2010 | Aoki |
| 2010/0208852 A1 | 8/2010 | Feher |

FOREIGN PATENT DOCUMENTS

| | | |
|---|---|---|
| CN | 1874334 | 12/2006 |
| EP | 1 156 598 A2 | 11/2001 |
| EP | 1560344 | 8/2005 |
| EP | 1578162 | 9/2005 |
| JP | 2005-167502 | 6/2005 |
| JP | 2005-244997 | 9/2005 |
| JP | 2005-260921 | 9/2005 |
| KR | 1020050052847 A | 6/2005 |
| NZ | 505658 | 2/2003 |
| RU | 2219665 | 12/2003 |
| TW | 1256789 | 6/2006 |
| TW | 1257779 | 7/2006 |
| WO | WO 96/23371 | 8/1996 |
| WO | WO 00/74415 | 12/2000 |
| WO | WO 02/33925 | 4/2002 |
| WO | WO 02093839 A2 | 11/2002 |
| WO | WO 03/088602 | 10/2003 |
| WO | WO 2004/075499 | 9/2004 |
| WO | WO 2005076557 A1 | 8/2005 |
| WO | WO 2005125250 A1 | 12/2005 |
| WO | WO 2007/108077 | 9/2007 |

OTHER PUBLICATIONS

Atarashi, H., "Broadband packet wireless access appropriate for high-speed and high-capacity throughput," Vehicular Technology Conference, 2001, pp. 566-570, vol. 1, Issue 2001.

Baumgartner, et al., "Performance of Forward Error Correction for IEEE 802.16e," 10th International OFDM Workshop, Hamburg, Germany, Aug. 2005.

Blestas et al., "Efficient Collaborative (Viral) Communication in OFDM Based WLANs", Proceedings of IEEE/ITS International Symposium on Advanced Radio Technologies (ISART 2003), Institute of Standards and Technology, Boulder Colorado, Mar. 4-7, 2003, pp. 27-32.

Brodersen, et al. "Corvus: a cognitive radio approach for usage of virtual unlicensed spectrum." Online. http://www.tkn.tu-berlin.de/publications/papers/CR_White_paper_final.pdf, 2004.

Cabric, et al., "A Cognitive Radio Approach for Usage of Virtual Unlicensed Spectrum," in Proc. of 14th IST Mobile Wireless Communications Summit 2005, Dresden Germany, Jun. 2005, 4 pages unnumbered.

Chiani, et al., "Ultra Wide Bandwidth Communications towards Cognitive Radio," EMC Europe Workshop, http://www-site.deis.unibo.it/Staff/giorgetti/pubblicazioni/Conferences/emc05_mcaggl.pdf, 2005, pp. 114-117, Rome, Italy.

Goeckel, et al., "On the Design of Multidimentional Signal Sets for OFDM Systems," IEEE Transactions on Communications, vol. 50 No. 3, pp. 442-452, Mar. 2002.

Goeckel, "Coded Modulation With Non-Standard Signal Sets for Wireless OFDM Systems," IEEE, pp. 791-795, 1999.

International Search Report from International Application No. PCT/US2007/010020, Search dated Nov. 5, 2007.

International Search Report from International Application No. PCT/US2007/085556, Search dated Mar. 26, 2008.

International Search Report from International Application No. PCT/US2007/011642, Search dated Sep. 28, 2007.

International Search Report from International Application PCT/US2007/010021, Search dated Oct. 17, 2007.

Johnsson, "HiperLAN/2—The Broadband Radio Transmission Technology Operating in the 5 GHz Frequency Band," HiperLAN/2 Global Forum, 1999, Version 1.0.

Krenik, et al., "Cognitive Radio Techniques for Wide Area Networks," Annual ACM IEEE Design Automation Conference, Proceedings of the 42nd Annual Conference on Design Automation, 2005, 409-412, San Diego, USA, ISBN:1-59593-058-2.

Lawrey, et al., "Adaptive Frequency Hopping for Multiuser OFDM," Second International Conference on Information, Communications & Signal Processing, ICICS '99, Singapore, Dec. 7-10, 1999.

Li, et al., "Clustered OFDM with Channel Estimation for High Rate Wireless Data," IEEE, 1999, pp. 43-50.

Mitola, III, et al., "Cognitive Radio an Integrated Agent Architecture for Software Defined Radio," *Royal Institute of Technology (KTH)*, Teleinformatics Electrum 204, SE-164 40 Kista Sweden, pp. title page through 304, May 8, 2000.

Mitola, et al., Absract from "Cognitive Radio: Making Software Radios More Personal," Personal Communications, IEEE, Aug. 1999, vol. 6, Issue 4, pp. 13-18, Stockholm, Sweden, ISSN: 1070-9916.

Okada, et al., "Pre-DFT Combining Space Diversity Assisted COFDM," IEEE Transactions on Vehicular Technology, vol. 50, No. 2, pp. 487-496, Mar. 2001.

Pottie, "Wireless Multiple Access Adaptive Communications Techniques," Online. http://www.ee.ucla.edu/~pottie/papers/encycl.pdf, 1999.

Sereni et al., "A Software *RADIO OFDM* Transceiver for WLAN Applications," Electronic and Information Engineering Department(DIEI)—University of Perugia—Italy, pp. 1-14, Apr. 2001.

She, et al., "Adaptive Turbo Coded Modulation for OFDM Transmissions," Communication Technology Proceedings, 2003. ICCT 2003, Apr. 9-11, 2003, pp. 1491-1495, vol. 2, Beijing China.

Tewfik, et al., "High Bit Rate Ultra-Wideband OFDM," Global Telecommunications Conference, 2002. GLOBECOM apos;02. IEEE, Nov. 2002, pp. 2260-2264, vol. 3.

Wahlqvist, et al., "A Conceptual Study of OFDM-based Multiple Access Schemes," Telia, Jun. 5, 1996. http://www.es.lth.se/home/oes/pdfs/etsil.pdf.

Wang, et al., "Complex-Field Coding for OFDM Over Fading Wireless Channels," IEEE Transactions on Information Theory, Mar. 2003, pp. 707-720, vol. 49, No. 3.

Wong, et al., "Multiuser OFDM with Adaptive Subcarrier, Bit, and Power Allocation," *IEEE Journal on Selected Areas in Communications*, vol. 17, No. 10, Oct. 1999, pp. 1747-1758.

Written Opinion from International Application No. PCT/US2007/010020, Search dated Nov. 5, 2007.

Written Opinion from International Application No. PCT/US2007/085556, Search dated Mar. 26, 2008.

Written Opinion from International Application No. PCT/US2007/011642, Search dated Sep. 28, 2007.

Written Opinion from International Application PCT/US2007/010021, Search dated Oct. 17, 2007.

Zhang, et al., "Adaptive OFDM System Design for Cognitive Radio," In: 11th International OFDM—Workshop, Aug. 30-31, 2006, Hamburg, Germany, pp. 91-95, IEEE Communications Society.

Youngblood, G., "A Software—Defined Radio for the Masses, Part 1," http://www.ece.jhu.edu/~cooper/SWRadio/Ybloodl.pdf, Jul./Aug. 2002, pp. 1-9.

"Software Defined Radio", http://www.altera.com/end-markets/wireless/software/sdr/wir-sdr.html, 4 pgs.

"About SDR Technology," 1 http://www.sdrforum.org/pages/aboutSdrTech/aboutSdrTech.asp, 1 pg.

"Software defined radio," http://www.wipro.com/webpages/insights/softwareradio.htm, 1 pg.

CN Notice on the First Office Action for Application No. 200880125896.9, Aug. 27, 2012.

Alonistioti, "End-to-End Reconfigurability: Evolution on Reconfiguration Metamodel", OMG SBC 2005, Aug. 17, 2005.

Bard, "Joint Tactical Radio System", Space Coast Communication Systems Inc., 2003.

Bourse, "End-To-End Reconfigurability (E2R): Enabling Interoperability, Management and Control of Complex Heterogeneous Systems", URSI GA 2005, Oct. 2005.

Sgandurra, "Achieving SCA Compliance for COTS Software Defined Radio, Second Edition", Pentek, 2006.

PCT Written Opinion and International Search Report, Application No. PCT/US2008/087860, May 21, 2009.

International Search Report from corresponding Application No. PCT/US2007/010020, Nov. 5, 2007.

Examiner's First Report on Australian patent application No. 2007243348, May 24, 2010.

Office Action in corresponding Chinese Application No. 200780015172.4 dated Dec. 30, 2010.

Taiwan Search Report for TW 096116940, dated Sep. 8, 2010, 1 page.

JP Notice of Reason for Rejection for Application No. 2009-509894, Mar. 21, 2012.

CN First Office Action, Application No. 200780016912.6, Mar. 31, 2012.

JP Reason for Rejection, Application No. 2009-507775, Mar. 21, 2012.

Examiner's First Report dated Aug. 18, 2010 from Australian Patent Application No. 2007333404.

Tejera, "Subchannel Allocation in Multiuser Mutliple Input Mutliple Output Systems." IEEE Transactions on Information Theory. Jul. 4, 2006. pp. 1-34.

Office Action from Chinese Patent Application No. 200780045500.5 dated Jan. 31, 2012.

Roel Schiphorst, "A Bluetooth-enabled HiperLAN/2 receiver," Vehicular Technology Conference 2003, pp. 3443-3447.

EP Communication for Application No. 08747424.3-1525/2143222 PCT/US2008062321, reference FB22296, Aug. 22, 2012.

Rhee, Increase in Capacity of Multiuser OFDM System Using Dynamic Subchannel Allocation, May 15, 2000. XP-000968037.

\* cited by examiner

ORTHOGONAL FREQUENCY DIVISION MULTIPLE ACCESS WITH CARRIER SENSE

BACKGROUND

Wireless communication is widely used by computing devices. Because of its widespread use, there is a risk that, at any time in any location, multiple computing devices will be present and transmitting wireless signals. Such transmissions may interfere with each other. To avoid such interference, transmission schemes have been developed to separate wireless transmissions by one computing device from wireless transmissions by other computing devices operating in the same location.

One approach for separating transmissions is to define time slots for the computing devices. Computing devices in the same location may use different time slots for wireless communication so that devices that could interfere with each other are not transmitting at the same time. This approach is sometimes called time division multiplexing.

Different protocols using different approaches to assign time slots are known. In some instances, time slots may be assigned to clients in a network. The time slots may be assigned in advance as part of the design of the network or may be assigned by a device acting as a network controller as devices connect to the network. Another approach is to allow individual devices in a network to select time slots by identifying time slots that are available for use.

As an example, 802.11 protocols use an approach called Carrier Sense Multiple Access (CSMA) to allow clients to select available time slots. Under CSMA, a device wishing to transmit on a channel "listens" on that channel before transmitting. If the device senses traffic on the channel, it waits a random interval and then listens again to determine if the channel is then available. The device may repeat the process of sensing and waiting a random interval until the channel is available. After multiple attempts, if the channel is not available, the client may determine that the channel is not suitable. The client may then attempt to communicate over a different channel or may take other corrective action.

Another mechanism for separating transmissions is called Frequency Division Multiplexing. With Frequency Division Multiplexing, different devices may be assigned different ranges of frequencies to use as channels for communication. The transmissions from different devices may be separated using frequency domain filtering even if multiple devices are transmitting at the same time. For Frequency Division Multiplexing to be effective, the channels used by the devices in the same location should not overlap, which can limit the number of devices that may communicate in one location at a time, particularly if portions of the frequency spectrum are unavailable because of interference.

A refinement on frequency division multiplexing is called Orthogonal Frequency Division Multiple Access (OFDMA). With OFDMA, an available range of frequencies is divided into multiple subcarriers. Each device may be assigned a set of subcarriers to use for transmitting information. The subcarrier assignments are said to be "orthogonal" in that the subcarrier assignments are made such that, to the extent practical each device uses a unique set of subcarriers. To the greatest extent possible, no subcarrier is used by more than one device. There is no requirement, however, that the subcarriers be contiguous. As a result, subcarriers can be flexibly assigned and there is a high likelihood that devices in the same location can communicate without interfering with each other.

SUMMARY OF INVENTION

Improved wireless communication for computing devices is provided by enabling the devices to exchange information about assignment of subcarriers to devices. Information about subcarrier usage may be communicated between devices using information elements embedded in control messages associated with a wireless network to which the computing devices may connect.

In one aspect, an information element may be used to communicate a subcarrier assignment from one device to another. That subcarrier assignment may be developed by one device, such as an access point, using OFDMA principles. That device also may sense activity in the subcarriers and limit use of particular subcarriers based on sensed activity in those subcarriers when making the assignments. Subcarrier assignments may be made by selecting and dynamically aggregating subcarriers or may be made by selecting a pre-defined group of subcarriers. If subcarriers are dynamically aggregated, sensed activity in a subcarrier may preclude use of that subcarrier in a subcarrier assignment. If subcarriers are assigned in predefined groups, sensed activity in any subcarrier in a group may preclude use of the group.

According to another aspect of the invention, a device configured to support OFDMA communications may communicate over a limited number of subcarriers, even if the device with which it is communicating is not configured to support OFDMA. The device may select a subset of subcarriers within a channel assigned to it. That device may communicate information on the selected subcarriers to other devices with which the device may communicate. Devices receiving transmissions from the device may use that information to identify subcarriers of an assigned channel that the transmitting device did not use. The receiving device may alter operation of its error detection and/or error correction software so that a lack of information received in the unused subcarriers will not be interpreted as an error.

To facilitate integration of these techniques into networks that may contain both OFDMA-capable and non-OFDMA-capable devices, information about subcarrier usage may be communicated in a format that can be received by a non-OFDMA-capable device. In some embodiments, network control messages, such as beacons and probes, may be transmitted using base rates accessible to non-OFDMA-capable devices. Control messages also may be used by devices to communicate their capability to support OFDMA communications.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
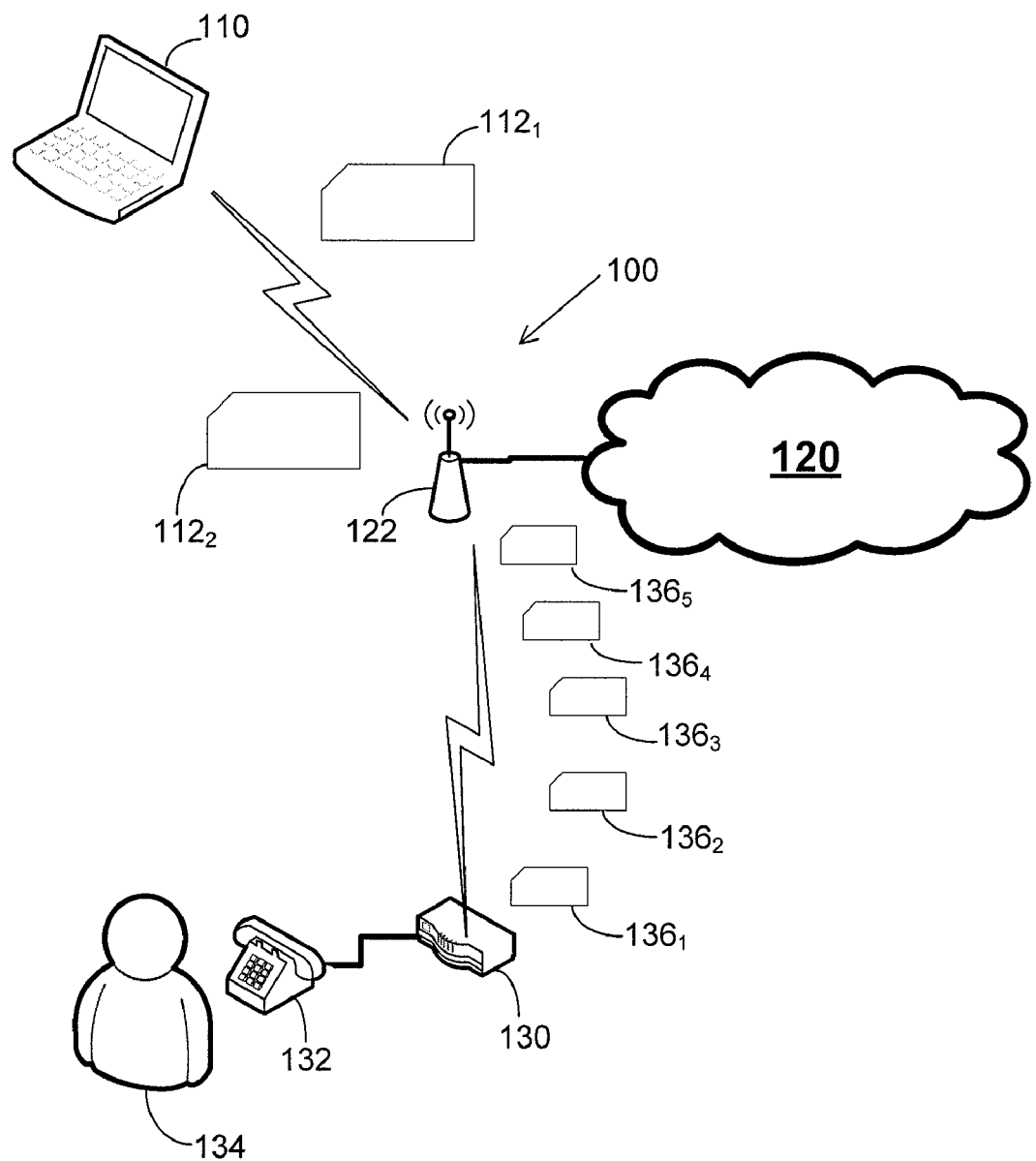
FIG. 1 is a sketch of a network environment in which embodiments of the invention may be employed.

The inventors have appreciated that wireless communications among computing devices may be improved through the use of information elements in network control messages to communicate information related to subcarrier usage. The information may be a subcarrier assignment, an identification of subcarriers in use by a device, information about capabilities of a device to communicate over one or more subcarriers, or other suitable information that may be used in selecting or communicating over subcarriers.

By providing a mechanism to communicate information relating to subcarrier usage, subcarrier assignment techniques that facilitate wireless communication may be implemented. One mechanism for making a subcarrier assignment may include sensing activity levels within a channel and using sensed activity levels on subcarriers in making subcarrier assignments. In some embodiments of the invention, activity levels are sensed using processing that includes listening and waiting a random back-off interval before listening again, as is conventionally performed in CSMA systems. Activity may be sensed in subcarriers individually, such that subcarriers may be selected individually for assignment to devices. In other embodiments, an activity level may be determined in the aggregate within sub-channels formed of groups of subcarriers and subcarriers may be assigned by assigning a sub-channel based on activity within the sub-channel.

Enabling communication of subcarrier information may also facilitate devices identifying and selectively using subcarriers from a sub-channel assigned to the device. An OFDMA-capable device may be programmed to select subcarriers, for example, when the device is operating from a battery or other limited power source, the aggregate amount of energy it transmits may be reduced by limiting the subcarriers in which the device transmits and/or for which it decodes and processes information. When a device selects a subset of its assigned subcarriers, the selected subcarriers may be communicated to other devices with which the device communicates so that those devices do not interpret lack of information in subcarriers that were not selected as an error. Those other devices may alternatively or additionally use the information on subcarriers in use by the device to select subcarriers for transmission to the device.

Enabling communication of subcarrier information may also facilitate assignment of subcarriers based on the type of information to be communicated. A communication subsystem of a device, for example, may receive information from application programs executing on the device to determine communication needs. This information may be used in making a subcarrier assignment to provide a sub-channel that has characteristics matching needs of the application.

These approaches of communicating and applying subcarrier assignment information may be used by OFDMA-capable devices, which contain hardware that can selectively transmit and receive on one or more designated subcarriers. These approaches may be used instead of or in addition to communication according to OFDMA based protocols, such as Wi-Fi. However, aspects of the invention can be used even in devices that are not OFDMA-capable. In some embodiments, information relating to subcarrier usage is conveyed as information elements added to network control messages in a standard format, such as control messages transmitted according to an 802.11 protocol or the Wi-Fi protocol. According to these protocols, such messages may use base rates encoded in a format that can be received by devices that are not OFDMA-capable.

In addition, according to embodiments of the invention, an OFDMA-capable device may exhibit different behaviors, depending on whether it is communicating with another an OFDMA-capable device. Information indicating which devices are OFDMA-capable may also be communicated in network control messages and used to shape behavior of devices that respond differently to OFDMA-capable and non-OFDMA-capable devices.

A device that does not support OFDMA may be programmed to respond to a message indicating that a device with which it is communicating is using a subset of assigned subcarriers by modifying its error detection and error correction processing to ignore subcarriers in which no information is being transmitted. In some embodiments, this change can be implemented in software, allowing OFDMA-capable devices to interface with non-OFDMA capable devices.

FIG. 1 illustrates a network environment in which embodiments of the invention may be employed. In the example of FIG. 1, a wireless access point 122 allows access to network 120. Network 120 may be any suitable network or networks. For example, network 120 may include a local area network to which access point 122 is connected. Alternatively or additionally, network 120 may include a local area network coupled to a wide area network, such as the Internet. Also, network 120 may include wired or wireless network components. Accordingly, the specific type and structure of network 120 is not critical to the invention.

Regardless of the nature of network 120, wireless access point 122 provides an interface for wireless devices to connect to network 120. In the example of FIG. 1, laptop computer 110 and VoIP interface 130 are shown communicating wirelessly with access point 122. Though two wireless devices are illustrated in FIG. 1, any number and type of wireless devices may be in the vicinity of wireless access point 122. Wireless access point 122 and any wireless devices located physically close and communicating through or to access point 122 may create a wireless network cell 100.

Because multiple devices may be transmitting radio frequency signals within cell 100, access point 122 and other wireless devices within cell 100 may employ techniques to reduce interference between devices in the cell. In the embodiment illustrated, wireless access point 122 may communicate using frequencies within an assigned channel. That channel may be divided into multiple subcarriers, different groups of which may be used by different devices within cell 100 to avoid interference.

In some embodiments, wireless devices within cell 100 may communicate using orthogonal sub-channel assignments. Some or all of the wireless devices may be OFDMA-capable. Though, it is not necessary that all devices within the cell be OFDMA compatible, and in some embodiments, some or all of the devices within cell 100 are not OFDMA-capable.

In the embodiment illustrated, access point 122 may assign subcarriers, though any suitable device may make subcarrier assignments. Any suitable criteria may be used in making assignments. In addition to selecting subcarriers for laptop 110 and VoIP interface 130 that are orthogonal, access point 122 may assign different numbers of subcarriers to provide links between access point 122 and the other devices based on applications executed by those devices.

To facilitate allocation of subcarriers, wireless devices within cell 100 may exchange subcarrier usage information. Subcarrier use information may communicate to a wireless device a subcarrier assignment determined by another device. Alternatively, subcarrier usage information may be sent from a device to notify other devices of the subcarriers in use by that device, though, other types of subcarrier usage information may be conveyed. For example, a first device may send information identifying a communication requirement that may be considered by a second device while forming a subcarrier assignment for the first device.

An ability to communicate a subcarrier requirement may allow subcarrier assignments that match network traffic requirements. By matching subcarrier assignments or traffic requirements, more efficient use of the available frequency spectrum may be made. As a specific example, FIG. 1 illustrates VoIP interface 130 communicating using smaller datagrams, such as packets $136_1$, $136_2$ ... $136_5$, than laptop 110, which communicates using larger datagrams, such as packets $112_1$ and $112_2$. Smaller packets $136_1$ ... $136_5$ may better support VoIP communications than larger packets, such as packets $112_1$ and $112_2$. In the embodiment illustrated, smaller packets are better suited for transmitting small amounts of data with low latency. Such smaller packets are therefore better suited for the application provided by VoIP interface 130. Such smaller packets may also be conveyed efficiently with fewer subcarriers than larger packets, such as packets $112_1$ and $112_2$.

Accordingly, in an embodiment in which access point 122 generates subcarrier assignments for devices in cell 100, VoIP interface 130 may communicate with access point 122 as part of a negotiation process leading up to a subcarrier assignment for VoIP interface 130. As part of that negotiation, VoIP interface 130 may communicate to access point 120 that VoIP interface 130 requires a subcarrier assignment with a relatively small number of subcarriers.

In contrast, laptop 110 may communicate files or other data structures requiring relatively large amounts of data to be communicated wirelessly. In such a scenario, communication may be more efficient using larger packets that each carry more data. A communication subsystem within laptop 110 may determine, by polling application programs executing on laptop 110 or in any other suitable way, that laptop 110 has a requirement for a subcarrier assignment with a relatively larger number of subcarriers to support effective communication of larger packets. Laptop 110 may communicate this requirement to access point 122 as part of a negotiation leading up to access point 122 making a subcarrier assignment for laptop 110.

A negotiation with a device that makes a subcarrier assignment, such as access point 122, in the example of FIG. 1, may entail an exchange of information in any suitable form. The negotiation may entail each device communicating information about its capabilities or requirements. For example, a negotiation may entail one or more of the devices indicating whether it is OFDMA-capable. Alternatively or additionally, one or more of the devices may communicate a subcarrier requirement. The subcarrier requirement may be communicated either directly or indirectly. For example, a device may communicate a requested number of sub-channels. Alternatively or additionally, a device may communicate a request for a subcarrier assignment providing a specific bandwidth. A device making a subcarrier assignment may determine a number of subcarriers required to provide a requested bandwidth and use that number in making a subcarrier assignment. Alternatively or additionally, other types of information may be provided to indirectly specify a requested number of subcarriers, including other communication parameters, such as latency or bandwidth.

The scenario illustrated in FIG. 1 in which laptop 110 and VoIP interface 130 communicate over links with different parameters may result from subcarrier assignments made by access point 122. However, the illustrated operating scenario may arise in other ways. As one example, each device may select subcarriers that it uses. To maintain an orthogonal allocation of subcarriers, devices that select subcarriers may select from among a set of subcarriers allocated to them. For example, VoIP interface 130 may use a smaller number of subcarriers than laptop 110. This configuration may arise even if access point 122 assigns both devices a sub-channel with the same number of subcarriers if VoIP 130 uses only a subset of subcarriers assigned to it by access point 122. VoIP interface 130 may then communicate to access point 122 which subcarriers it is using. This information may be communicated directly or indirectly, such as by listing subcarriers in use or, alternatively, by listing subcarriers that are not used. Regardless of the form in which this information is presented, it may be communicated as part of a negotiation of the subcarriers used by VoIP interface 130. Accordingly, a negotiation of subcarriers may entail multiple interactions between devices.

Regardless of the number and type of interactions, information used to negotiate a subcarrier assignment may be communicated between devices in any suitable form. According to embodiments of the invention, the information may be communicated in a form that makes it readily accessible even to devices that have not associated with access point 122. Additionally, the information may be made available in a format that can be received by a wide range of devices regardless of the types of subcarrier operations those devices perform. For example, devices that support communication according to the WiMax standard are OFDMA-capable. Such devices may be present within cell 100. However, many current devices do not support WiMax and are not OFDMA-capable. Accordingly, a subcarrier assignment may be negotiated using communications in a format that may be interpreted by both OFDMA-capable devices and non-OFDMA-capable devices.

According to an embodiment of the invention, information used in negotiating a subcarrier assignment may be exchanged in control messages as are used in operating of known wireless networks. Such control messages, even when sent by devices that are OFDMA-capable, may be transmitted in a base rate format that can be interpreted by non-OFDMA-capable devices. As a specific example, layer two network control messages may be used as a vehicle for transmitting subcarrier use information.

According to standard communication protocols, such as Wi-Fi and WiMax, such control messages may include information elements that convey information unrelated to the control information inherent in the control message. One or more information elements in each control message may be used to communicate subcarrier use information.

As a specific example, the Wi-Fi and WiMax standards specify control message such as a beacon, a probe, a probe response and an acknowledgement. A beacon control message may be transmitted periodically by an access point. A probe may be sent by a device attempting to associate with the access point. An access point may respond to a probe message with a probe response control message. The device may respond to a probe response with an acknowledgment message. Other control message, such as a renew message and a renew acknowledgment may also be employed. These or other types of control messages supported by other network types may alternatively or additionally be used as a vehicle for conveying subcarrier use information.

Figure 2A:
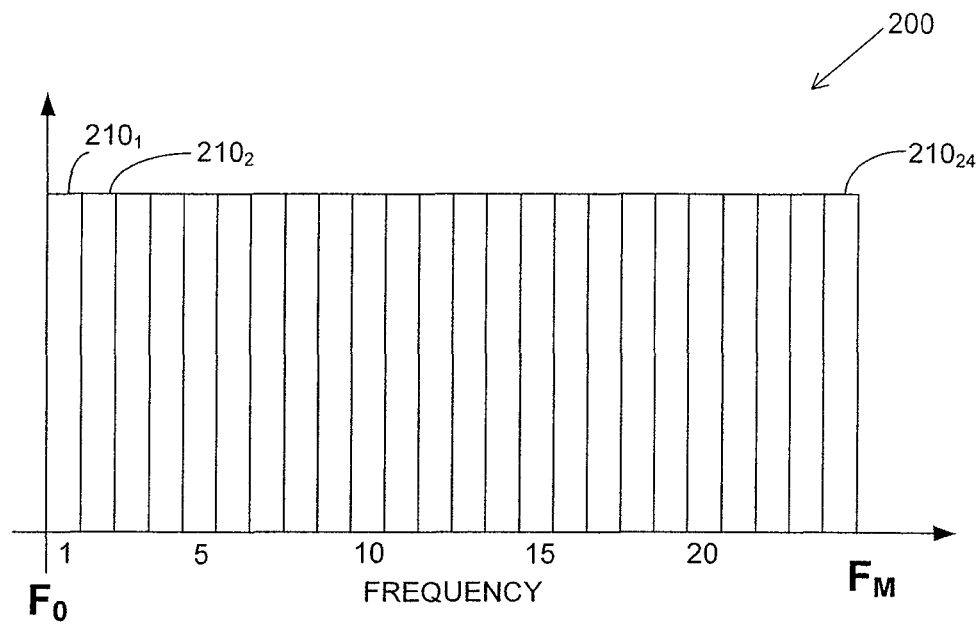
FIG. 2A is a conceptual sketch of a frequency spectrum of a channel that may be used for communication according to embodiments of the invention.

Regardless of the specific vehicle used to convey subcarrier use information, the information may be used according to embodiments of the invention to control wireless devices. Possible uses of subcarrier use information are explained in conjunction with the following figures. FIG. 2A illustrates a channel 200 that may be used for communications within cell 100. Channel 200 spans a frequency range. The specific frequency range may depend on the wireless technology or technologies used by devices in cell 100. As illustrated, channel 200 spans a frequency range from a frequency of $F_0$ to a frequency of $F_M$. However, the specific frequency range used is not critical to the invention, and any suitable frequency range may be used.

Channel 200 is divided into multiple subcarriers $210_1$, $210_2 \ldots 210_{24}$ (of which only $210_1$, $210_2$ and $210_{24}$ are number for simplicity). In this example, 24 subcarriers are illustrated. However, the number of subcarriers within channel 200 is not critical to the invention, and any suitable number may be used. Also, in the embodiment illustrated, the subcarriers are contiguous and span the entire range from $F_0$ to $F_M$. While such a configuration may provide more efficient processing of wireless signals as devices, it is not a requirement of the invention that the subcarriers be contiguous. Additionally, FIG. 2A illustrates each of the subcarriers being of the same width. However, each subcarrier may span any suitable frequency ranges and uniformity of subcarriers is not a requirement of the invention.

Regardless of the shape and size of each of the subcarriers, each subcarrier represents a range of frequencies that may be used by devices communicating within channel 200 to separately communicate information. For example, a device may interpret a signal transmitted in the frequency range represented by subcarrier $210_1$ as representing information. A signal in the frequency range represented by subcarrier $210_2$ may be separately detected and interpreted by the same device as conveying information that may be unrelated to the information conveyed by subcarrier $210_1$.

Figure 2B:
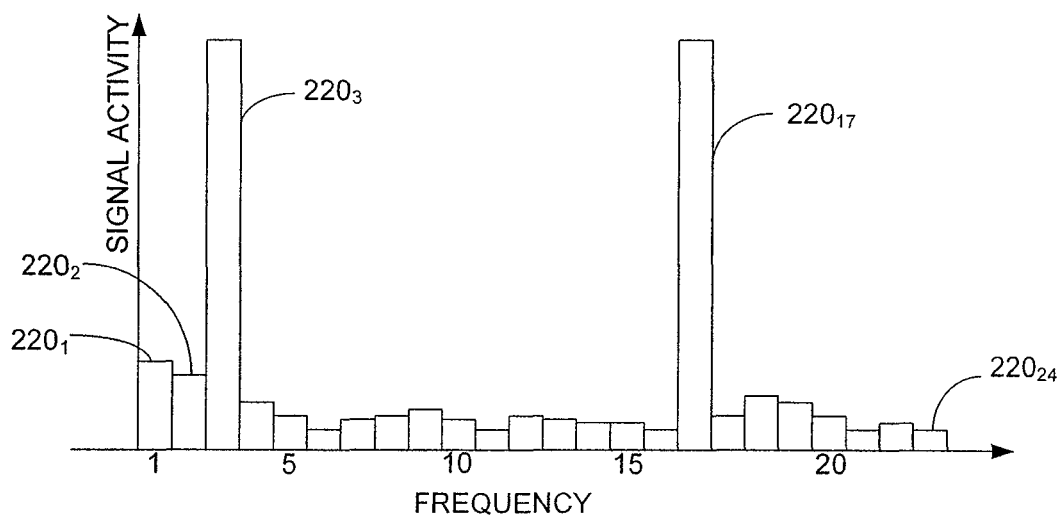
FIG. 2B is a conceptual sketch illustrating activity within the channel of FIG. 2A.

Because each subcarrier may convey information independent of information conveyed by other subcarriers, different subcarriers may be assigned to different devices to use. As a result, at any given time, the signal activity within channel 200 may be different in different subcarriers. FIG. 2B illustrates signal activity in channel 200 at a point in time. At the time illustrated in FIG. 2B, relatively high levels of signal activity are occurring in subcarriers $220_3$ and $220_{17}$. The scenario depicted in FIG. 2B may arise from a device assigned subcarriers $220_3$ and $220_{17}$ actively transmitting information. A transmitting device may be within cell 100 (FIG. 1) or may be in another cell in the vicinity of cell 100. Regardless of the source of the signals within subcarriers $220_3$ and $220_{17}$, the relatively high level of signal activity for those subcarriers indicates that if those subcarriers are assigned to a further device, signal interference could occur. Accordingly, relative levels of signal activity may be considered in making subcarrier assignments according to embodiments of the invention.

FIG. 2B illustrates graphically that subcarriers $220_3$ and $220_{17}$ have a relatively high signal activity level. Any suitable metric may be used to determine whether a relatively high signal level exists within a subcarrier. In some embodiments, techniques as are known in the art for performing carrier sense multiple access (CSMA) may be used. According to CSMA techniques, a device selecting a communication channel may monitor that channel for a short interval. If the device detects a signal representative of a device transmitting in that channel during the interval, the device may wait for a random amount of time, sometimes referred to as a "back-off interval." At the end of the back-off interval, the device may again monitor the channel to determine whether a signal representative of a transmission is present in the channel. This process of monitoring and waiting a random back-off interval may be repeated any suitable number of times. A similar approach may be applied on a subcarrier-by-subcarrier basis rather than across an entire channel. Accordingly, techniques used in CSMA communications may be used to select parameters such as the monitoring interval, the back-off interval and a specific signal level that, when detected, represents active communication. Though, any suitable parameters and values may be used to identify a subcarrier in active use. Regardless of how subcarrier activity is detected, it may be used as a factor in making subcarrier assignments.

Figure 3A:
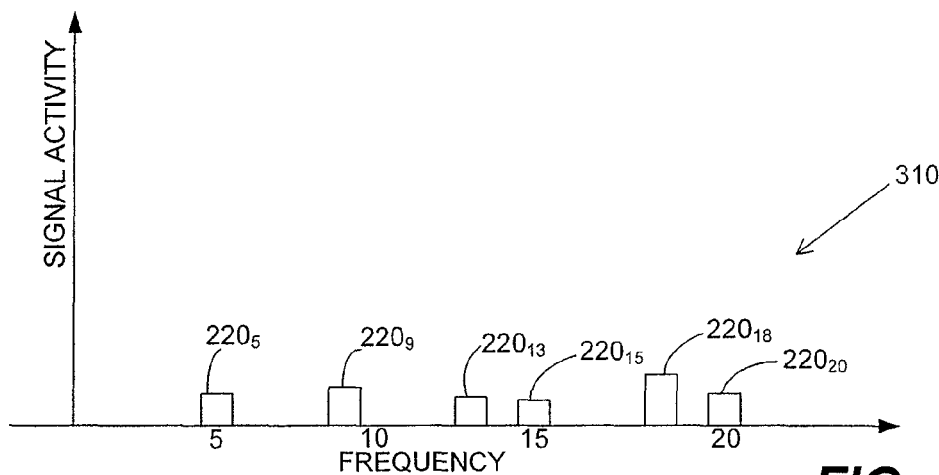
FIG. 3A is a conceptual sketch of subcarriers selected for assignment to a first device.
Figure 3B:
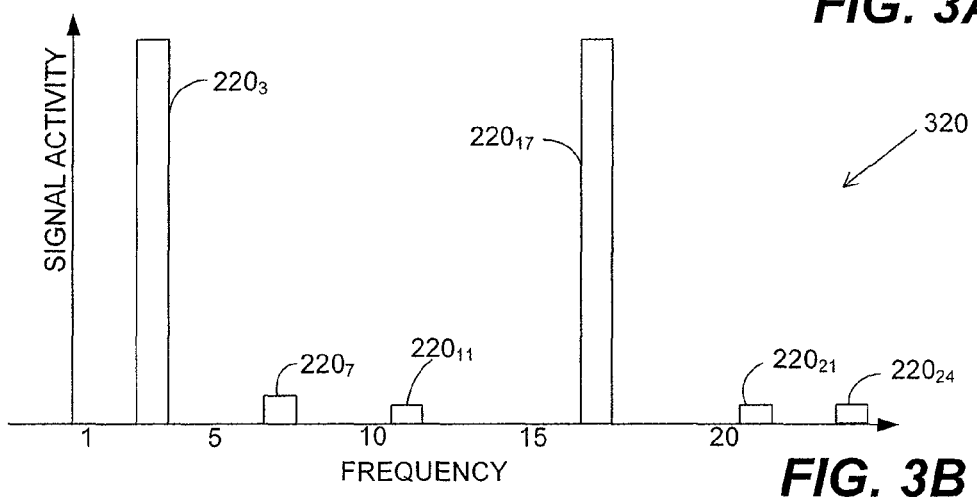
FIG. 3B is a conceptual sketch of an orthogonal subcarrier selection for a second device.

FIGS. 3A and 3B illustrate subcarrier assignments that may be made to two devices operating within cell 100. In the embodiment illustrated, the subcarrier assignments may be made by access point 122. However, subcarrier assignments may be made by any suitable device. In this example, subcarrier assignments are made to provide orthogonality and to take into consideration signal activity.

FIG. 3A illustrates a subcarrier selection 310 that may be used in forming a subcarrier assignment for a device 1. FIG. 3B illustrates a subcarrier selection 320, that may be used in forming a subcarrier assignment for a device 2. In this example, orthogonal subcarrier selections are made. As illustrated, the subcarrier selections are completely independent, with no subcarriers in subcarrier selection 310 also appearing in subcarrier selection 320. Though, other orthogonal selections providing low risk of interference may be made.

In this example, each of the subcarrier selections 310 and 320 includes six subcarriers. This number is depicted for illustration only, and each selection may include any suitable number of subcarriers. As illustrated, subcarrier selection 310 includes subcarriers $220_5$, $220_9$, $220_{13}$, $220_{15}$, $220_{18}$ and $220_{20}$. In contrast, subcarrier selection 320 (FIG. 3B) includes subcarriers $220_3$, $220_7$, $220_{11}$, $220_{17}$, $220_{21}$ and $220_{24}$.

Though orthogonal subcarrier selections may be used in making subcarrier assignments, signal activity may also be considered in making the subcarrier assignments. In subcarrier selection 310 (FIG. 3A), the signal activity in each of the selected subcarriers is relatively low. Accordingly, assigning the subcarriers in subcarrier selection 310 to device 1 is unlikely to cause interference with other devices. In contrast, subcarrier selection 320 includes subcarriers $220_3$ and $220_{17}$ with a relatively high level of signal activity. If subcarriers $220_3$ and $220_{17}$ are assigned to device 2, interference is likely to occur when device 2 transmits. Accordingly, when making a subcarrier assignment considering signal activity, subcarriers $220_3$ and $220_{17}$ may be omitted in the assignment to device 2.

Figure 3C:
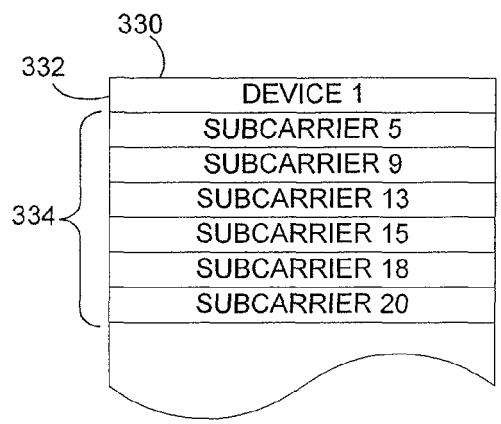
FIG. 3C is a sketch of an information element containing a subcarrier assignment to a first device according to an embodiment of the invention.
Figure 3D:
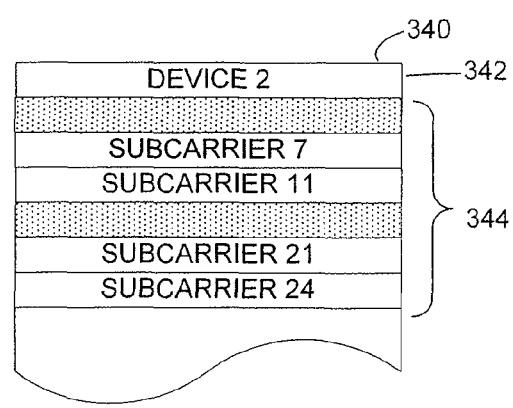
FIG. 3D is a sketch of an information element containing a subcarrier assignment to a second device according to an embodiment of the invention.

FIGS. 3C and 3D represent information elements 330 and 340, respectively, which may contain subcarrier assignments based on subcarrier selections 310 and 320. The subcarrier assignment depicted in information element 330 includes all of the selected subcarriers in subcarrier selection 310. In contrast, information element 340, though based on subcarrier selection 320, omits subcarriers $220_3$ and $220_{17}$ because of the relatively high level of signal activity in those subcarriers.

Information elements 330 and 340 illustrate a possible representation for a subcarrier assignment. Each of the information elements 330 and 340 may be stored in computer storage media associated with access point 122 or other device making subcarrier assignments. The subcarrier assignments may be used in formatting transmissions to specific devices and/or for decoding transmission from those devices. For example, signals received in subcarriers $220_5$, $220_9$, $220_{13}$, $220_{15}$, $220_{18}$ and $220_{20}$ may be decoded to generate digital bits which may be combined to represent a single transmission from device 1. To send a block of digital bits to device 1, the block of digital bits may be represented by a collection of signals transmitted in in subcarriers $220_5$, $220_9$, $220_{13}$, $220_{15}$, $220_{18}$ and $220_{20}$. Information may similarly be exchanged with device 2 using the subcarriers in the subcarrier assignment represented by information element 340.

FIGS. 3C and 3D illustrate one form of information elements that may be used to store subcarrier assignments. In the example illustrated, each information element contains multiple fields. The fields contain values identifying the device for which the subcarrier assignment was made and the specific subcarriers contained in the assignment. In this example, field 332 in information element 330 identifies device 1, and field 334 represents a list of subcarriers in the assignment to device 1. Similarly, information element 340 contains a field with a value identifying device 2. List 344 identifies the subcarriers assigned to device 2.

Other fields, not expressly shown, may also be present. For example, a field identifying the information element as a subcarrier assignment may also be present. However, any suitable representation may be used to represent an information element according to embodiments of the invention.

Regardless of the specific form of an information element, the information element may be stored in computer memory associated with devices that will communicate with the devices indicated in the information elements. The information elements may be communicated from a device generating the subcarrier assignment to other devices in any suitable way. In some embodiments, the information elements may be inserted into control messages, such as a beacon, probe, probe response or an acknowledgment. As described above, some standardized protocols allow devices to insert information elements into such control messages. Such standardized protocols may be used to convey information elements, such as information elements 330 and 340. When such standardized protocols are used, the information elements may be inserted into control messages using known hardware and software components. However, any suitable protocol may be used for conveying information elements between devices, and the information elements may be incorporated into any suitable messages communicated between devices.

Figure 4A:
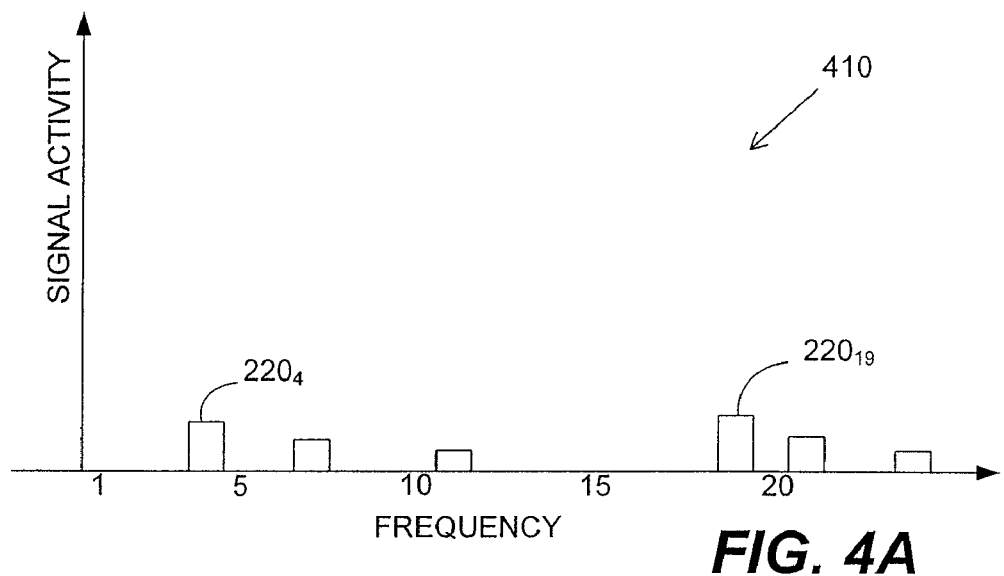
FIG. 4A is a conceptual sketch of subcarriers selected for assignment to the second device according to an alternative embodiment of the invention.
Figure 4B:
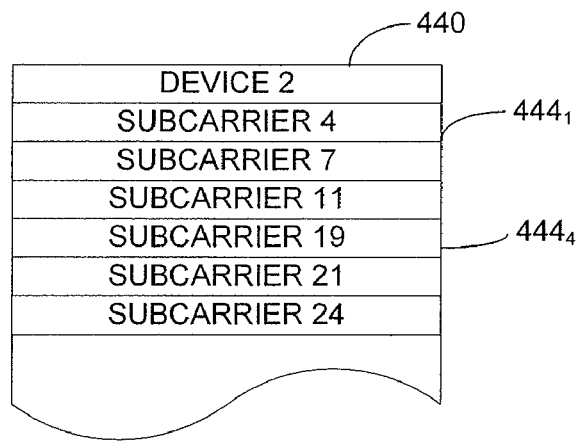
FIG. 4B is a sketch of the information elements depicted in FIG. 3D according to an alternative embodiment of the invention.

FIG. 3B provides an example of an embodiment of the invention in which subcarriers with a relatively high activity level included in an orthogonal subcarrier selection are simply ignored in making a subcarrier assignment. Accordingly, list 334 includes four subcarriers. In contrast, list 334 includes six subcarriers, because subcarriers were omitted from selection 310. Such an approach may be suitable in embodiments in which device 2 can transmit effectively using a lower bandwidth then device 1. Alternative embodiments may be used when device 2 requires a higher bandwidth than is provided by the four assigned subcarriers. FIGS. 4A and 4B illustrate an alternative embodiment in which subcarriers with a relatively high signal activity level are replaced by other orthogonal carriers.

FIG. 4A illustrates a subcarrier selection 410. Subcarrier selection 410 may be created from subcarrier selection 320 (FIG. 3B). Subcarrier selection 410 includes the four subcarriers of subcarrier selection 320 that have a relatively low signal level. Additionally, subcarrier selection 410 includes subcarriers $220_4$ and $220_{19}$. These two subcarriers replace $220_3$ and $220_{17}$, which had a relatively high signal activity level. Accordingly, when a subcarrier assignment is made for device 2 based on subcarrier selection 410, the subcarrier assignment includes six subcarriers.

Information element 440 is illustrated in FIG. 4B with the subcarrier assignment based on subcarrier selection 410. As can be seen in FIG. 4C, information element 440 includes list elements $444_1$ and $444_4$, indicating that subcarrier $220_4$ and subcarrier $220_{19}$ are part of the subcarrier assignment.

Figure 5A:
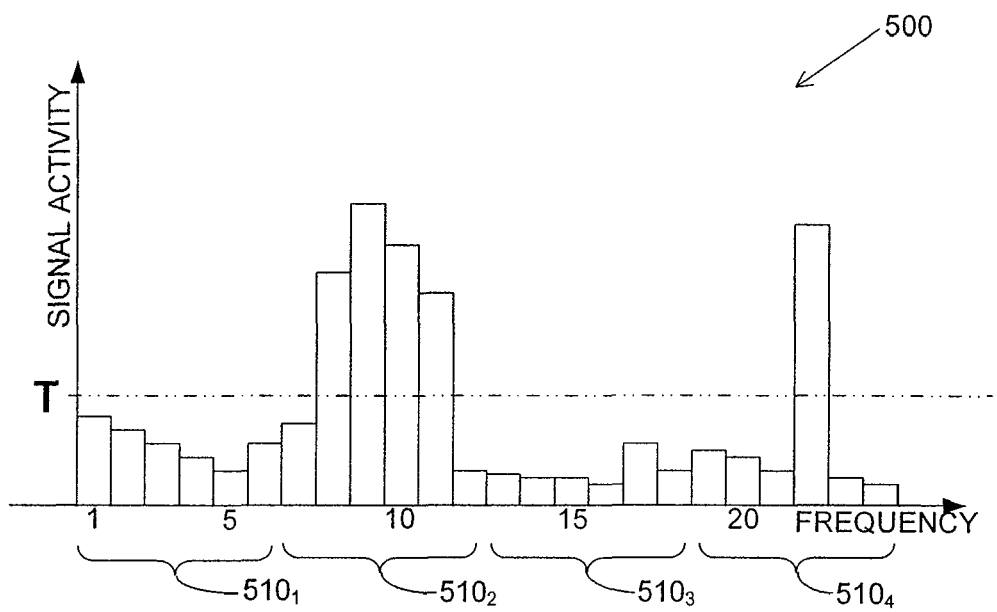
FIG. 5A is a conceptual sketch of activity levels in a channel that may be used for communication according to an embodiment of the invention.

In the example of FIG. 3B, signal activity was considered on a subcarrier-by-subcarrier basis. Accordingly, subcarrier assignments could include non-contiguous subcarriers. In some embodiments, subcarrier assignments may be made in a fashion that ensures that each subcarrier assignment includes contiguous subcarriers. FIG. 5A illustrates a channel 500 that has been divided into groups $510_1 \ldots 510_4$ of contiguous subcarriers. In this example, each of the groups $510_1 \ldots 510_4$ includes six subcarriers. In embodiments in which subcarrier assignments are made to provide orthogonal subcarriers for each device, each of the groups $510_1 \ldots 510_4$ may be assigned to a different device and only one device in a cell may be assigned each group.

Groups $510_1 \ldots 510_4$ may be formed in any suitable way. In some embodiments, the groups may be predefined by a network administrator. Regardless of how the groups $510_1 \ldots 510_4$ are defined, signal activity level may also be considered in making subcarrier assignments. As shown in FIG. 5A, group $510_2$ includes at least one subcarrier with a signal activity level above a threshold. As described above, techniques as are known in CSMA systems may be used to determine whether a relatively high signal activity level is present. Those same techniques may be applied to groups as illustrated. In applying these techniques, the signal activity level in each subcarrier may be considered individually to determine whether any subcarrier in a group has a high activity level. Alternatively or additionally, the contiguous subcarriers within each group may be considered as a sub-channel and the overall signal activity level may be considered in that sub-channel.

Figure 5B:
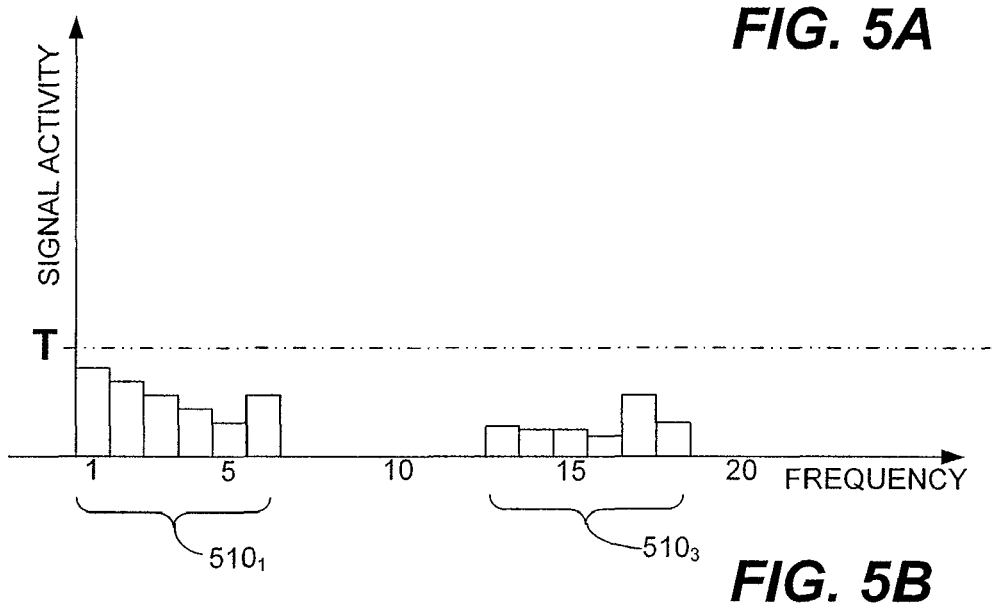
FIG. 5B is a conceptual sketch of predefined groups of subcarriers that may be used in making subcarrier assignments according to an alternative embodiment of the invention.

Regardless of how a group with a relatively high signal activity level is detected, groups with relatively high signal activity levels may be omitted in making sub-channel assignments. In the scenario illustrated in FIG. 5A, group $510_2$ has at least one subcarrier with a signal activity level above the threshold T. Accordingly, group $510_2$ is not used to make a subcarrier assignment. Likewise, group 5104 has at least one subcarrier with a signal activity level above the threshold T. Group $510_4$ is also not used. Accordingly, FIG. 5B illustrates that groups $510_1$ and $510_3$ are available for making subcarrier assignments. When group $510_1$ or $510_3$ is selected, the selection may be represented in an information element in the form illustrated in FIGS. 3C, 3D or 4B. Though, other representations are possible. For example, an information element representing a subcarrier assignment may contain a field identifying a device to which the assignment is made and the predefined group that is assigned. However, an information element to convey a subcarrier assignment based on a predefined group may be created in any suitable form.

The above-described techniques for subcarrier assignments may be used in a process executed in a device performing subcarrier assignments. In the environment illustrated in FIG. 1, the process 600 may be performed within access point 122. However, process 600 may be performed in any suitable device.

Figure 6:
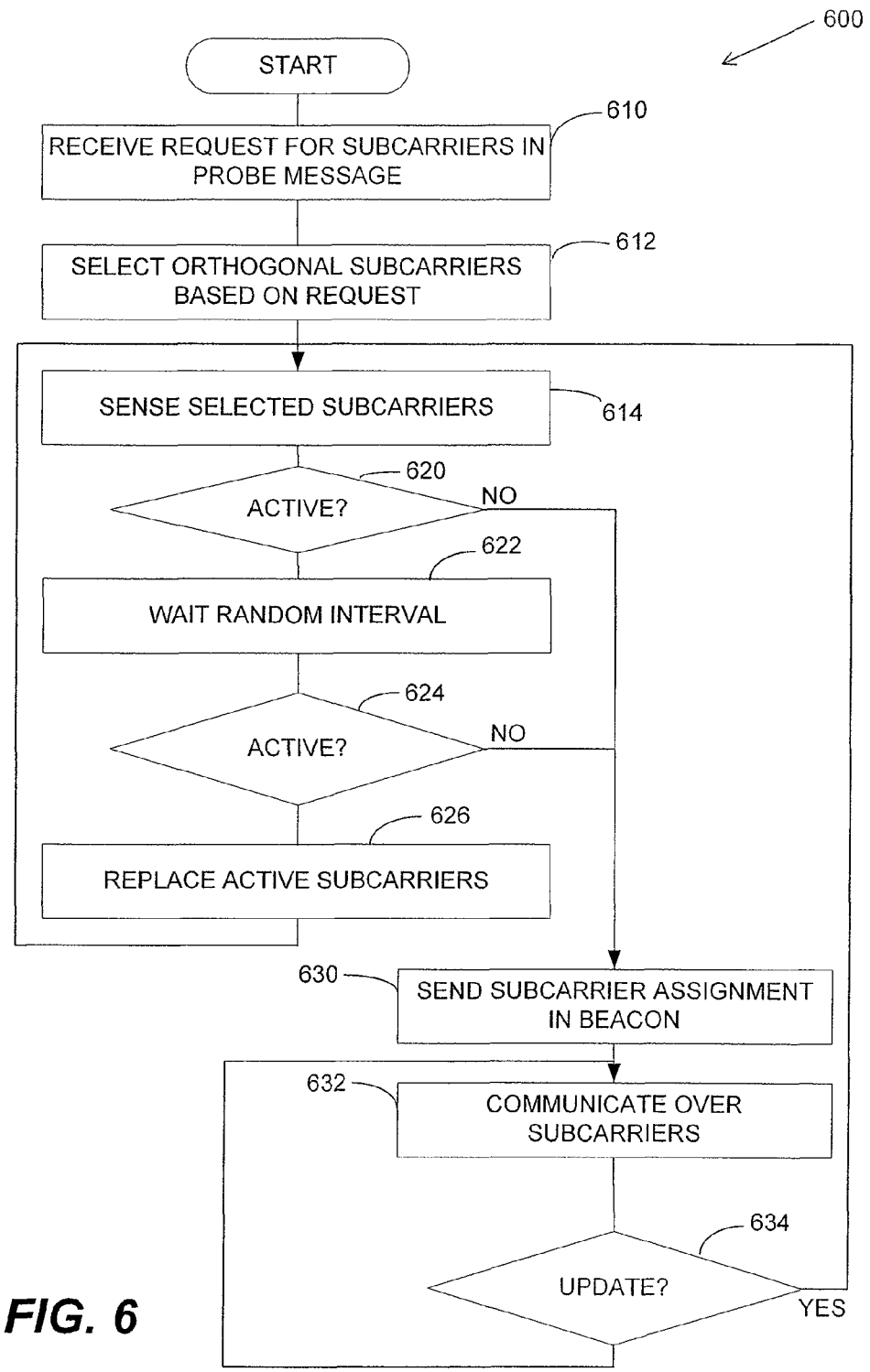
FIG. 6 is a flowchart of a process of assigning subcarriers to a device according to an embodiment of the invention.

Process 600 begins at block 610 when access point 122 receives a request for a subcarrier assignment in a probe message. In FIG. 6, a probe message serves as an example of a control message that may initiate a subcarrier assignment process. However, any suitable mechanism may be used to communicate a request. Also, in some embodiments, a subcarrier assignment may be initiated in response to events other than an express request. For example, a subcarrier assignment may be initiated in response to a request by a device to associate with access point 122, which may be interpreted as an implied request for a subcarrier assignment Regardless of how the request is communicated to access point 122, the process may proceed to block 612. At block 612, orthogonal subcarriers may be selected. Orthogonal subcarriers may be selected in any suitable way. Techniques as known in the art for selecting orthogonal subcarriers in OFDMA systems may be used at block 612. Such a selection may result in completely disjoint sets of subcarriers being selected for an assignment to each device. However, the invention is not so limited, and, orthogonal sets of subcarriers may provide separation between transmissions by devices without being completely disjoint. In some embodiments, sets of subcarriers may be selected that contain subcarriers used in other sets. Accordingly, any suitable processing may be used at block 612 to select a set of subcarriers.

Any suitable number of subcarriers may be selected at block 612. In some embodiments, the number of subcarriers may be fixed. In other embodiments, the number of subcarriers selected may be based on parameters included in the request received at block 610. Regardless of the number of subcarriers selected, processing may proceed to block 614. At block 614, signal activity levels may be sensed in the selected subcarriers.

Process 600 may branch at decision block 620 depending on the levels sensed at block 614. If activity is detected in at least one subcarrier, the process branches to block 622. Conversely, if no activity is detected, the process branches to block 630. Any suitable criteria may be used at decision block 620 to determine whether activity is present. For example, detected signal levels may be compared to a threshold as described above in connection with FIG. 5.

At block 622, a random interval is selected and the process waits until that random interval passes. At block 624 activity in the selected subcarriers may again be sensed and the process may again branch depending on the sensed activity level. If no activity is sensed, the process may branch from decision block 624 to block 630. Alternatively, if activity level is again detected, processing may proceed to block 626.

If processing reaches block 626, a signal level indicating active use of at least one of the selected subcarriers has been detected. The process of sensing and waiting a random back-off interval may be repeated multiple times. However, in the embodiment illustrated in FIG. 6, the sensing is repeated only once. Accordingly, if processing reaches decision block 626, the subcarrier or subcarriers in which signal levels indicating activity may be replaced in the selection. As indicated in FIG. 4A, the active subcarriers may be replaced with other orthogonal subcarriers. Though in other embodiments, subsequent processing may include reducing the number of subcarriers in the set or otherwise responding to the activity level.

The process then loops back to block 614 where the process of detecting active subcarriers is repeated for the new selection of subcarriers. The process may loop through blocks 614, 620, 622, 624 or 626 until a selection of subcarriers is made that meets defined selection criteria.

If none of the subcarriers has an activity level sufficiently high to indicate the subcarrier is in active use, the process may branch from decision block 620 to block 630. At block 630, the selected subcarriers may be used to form a subcarrier assignment. Those subcarriers may be represented in an information element which may be included in a beacon. Access point 122 may then send the subcarrier assignment as part of its next beacon transmission.

At block 632, the access point 122 may communicate with the device for which is the assignment was made using the assigned subcarriers. The process may than branch at decision block 634 based on whether the subcarrier assignment needs to be updated. Because channel activity may change over time, subcarrier assignments made based upon signal activity level may be updated. Any suitable trigger events may be used to determine whether an update is required. In some embodiments, subcarrier assignments may be updated periodically. In other embodiments, subcarrier assignments may be updated in response to communication problems or other events that may indicate that signal activity levels have changed. Accordingly, the specific processing used at decision block 634 to determine whether an update is required is not critical to the invention. However, if no update is required, the process loops back to block 632 where the previously assigned subcarriers are used for communication. Conversely, if, as determined at decision block 634 an update is required, the process branches back to block 614 where the activity level in selected subcarriers is again sensed and the subcarrier selection may be changed if activity is detected.

Figure 7:
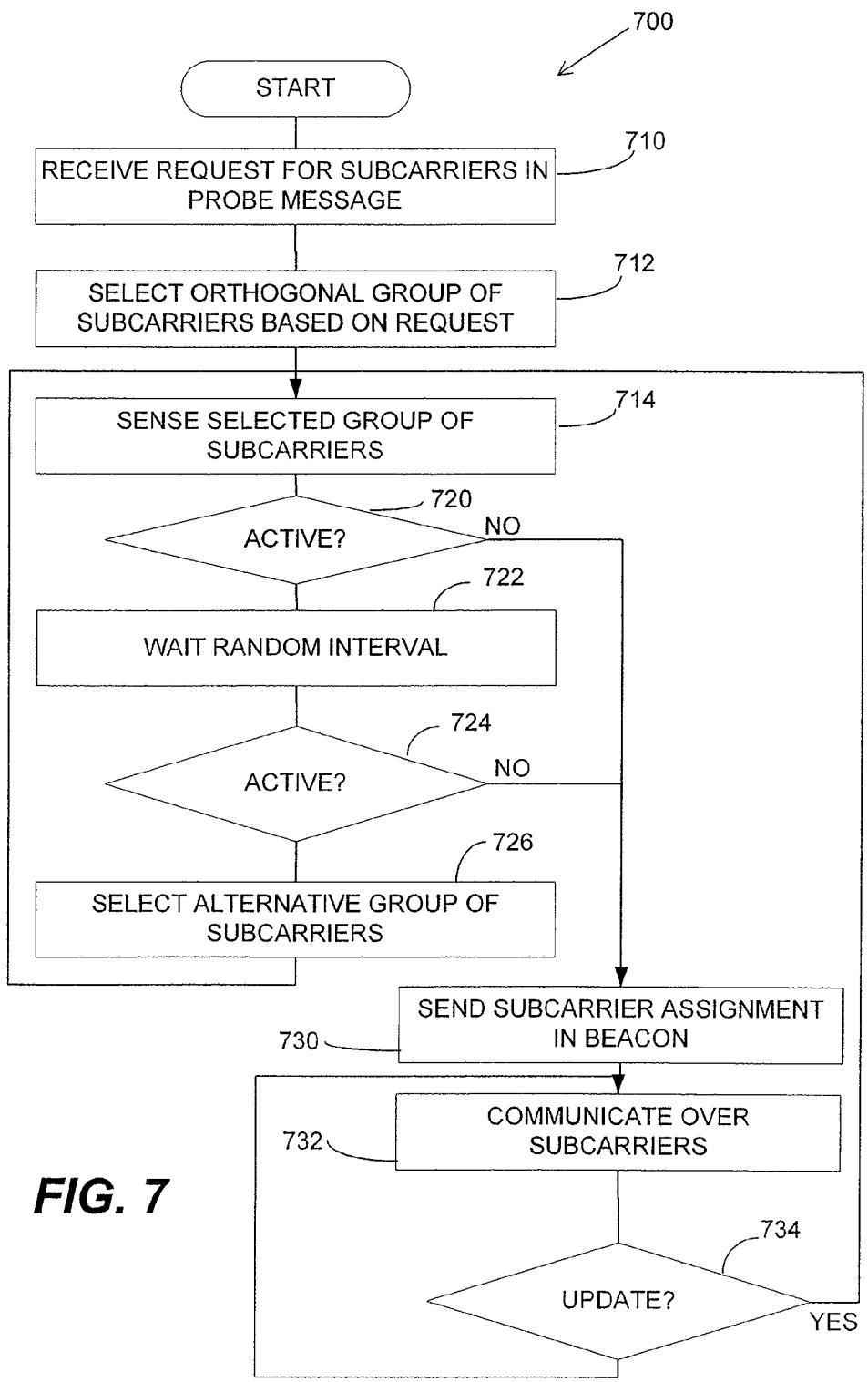
FIG. 7 is a flowchart of a process of assigning subcarriers according to an alternative embodiment of the invention.

FIG. 7 illustrates an alternative process 700 that may be performed by access point 122 or other device making subcarrier assignments. Process 700 may begin at block 720 where the device making a subcarrier assignment receives a request. In the example illustrated, a request may be received as an information element in a probe message. However, the request may be communicated in a suitable way.

Regardless of how the request is communicated, the process proceeds to block 712. At block 712, the device making the assignment selects a group of subcarriers based on the request. In contrast to the processing at block 612 (FIG. 6), the process at block 712 may involve selecting a predefined group of subcarriers as illustrated above in connections with FIGS. 5A and 5B. Such groups may be predefined by a network administrator or in any other suitable way. However, regardless of how the groups of subcarriers are defined, processing at block 612 may entail, to the greatest extent possible, assigning each predefined group to a single device within a cell. However, in some embodiments, the same predefined group may be assigned to multiple devices. In this scenario, processing at block 612 may entail employing alternative decision criteria to identify two or more devices that may use the same predefined group without an unacceptably high level of interference between transmissions from those devices.

Once an initial selection of a subcarrier group is made a block 712, process 700 proceeds to a loop involving blocks 714, 720, 722, 724, and 726. This loop may be repeated until a suitable group of subcarriers is selected or an error condition (not illustrated) is identified.

Regardless of the exit condition from the loop, processing begins at block 714. At block 714, activity within the selected group of subcarriers is selected. The activity may be sensed in any suitable way, including separately sensing activity in each of the subcarriers. Though, in some embodiments, a wideband measurement may be made that senses activity level within the group.

Regardless of how activity level is sensed, if activity is sensed, the process branches at decision block 720 to block 722. At block 722, a random interval is selected and process 700 waits that random interval.

At decision block 724, activity level across the sub-channel defined by the selected group of subcarriers is again sensed. Process 700 branches based on sensed activity level. If activity is sensed, the process proceeds to block 726. At block 726, an alternative group of subcarriers is selected. The process then loops back to block 714 where activity within the selected group of subcarriers is again sensed.

Process 700 illustrates that an alternative group is selected at block 726 after two attempts are made to sense activity. Any suitable criteria may be used to determine that a group of subcarriers is in use and therefore not suitable for assignment to a further device. Also, any suitable response may be made upon a determination that a group of subcarriers is active.

The loop represented by block 714, 720, 722, 724 and 726 may be repeated until a group of subcarriers that is not active is identified. Upon identification of such a group, process 700 branches, either from decision block 720 or decision block 724 to block 730. At block 730, the identified group of subcarriers is used to form an assignment. That assignment is communicated to the device requesting the subcarriers at block 710. In the embodiment illustrated, the subcarrier assignment is communicated in a beacon sent by access point 122 (FIG. 1). However, any suitable mechanism may be used to communicate a subcarrier assignment to a device.

Once the subcarrier assignment is communicated, that device may configure itself for communication using the assigned group of subcarriers. Accordingly, process 700 proceeds to block 732 where the device communicates using the assigned subcarriers.

Periodically, or based on any other suitable trigger, process 700 may loop back to block 714. At block 714, the group of subcarriers assigned to a device may be sensed to determine whether it is still suitable for use by the assigned device. In the embodiment illustrated, updating the assignment may detail repeating the processing within the loop defined by block 714, 720, 722, 724 and 726.

Figure 8:
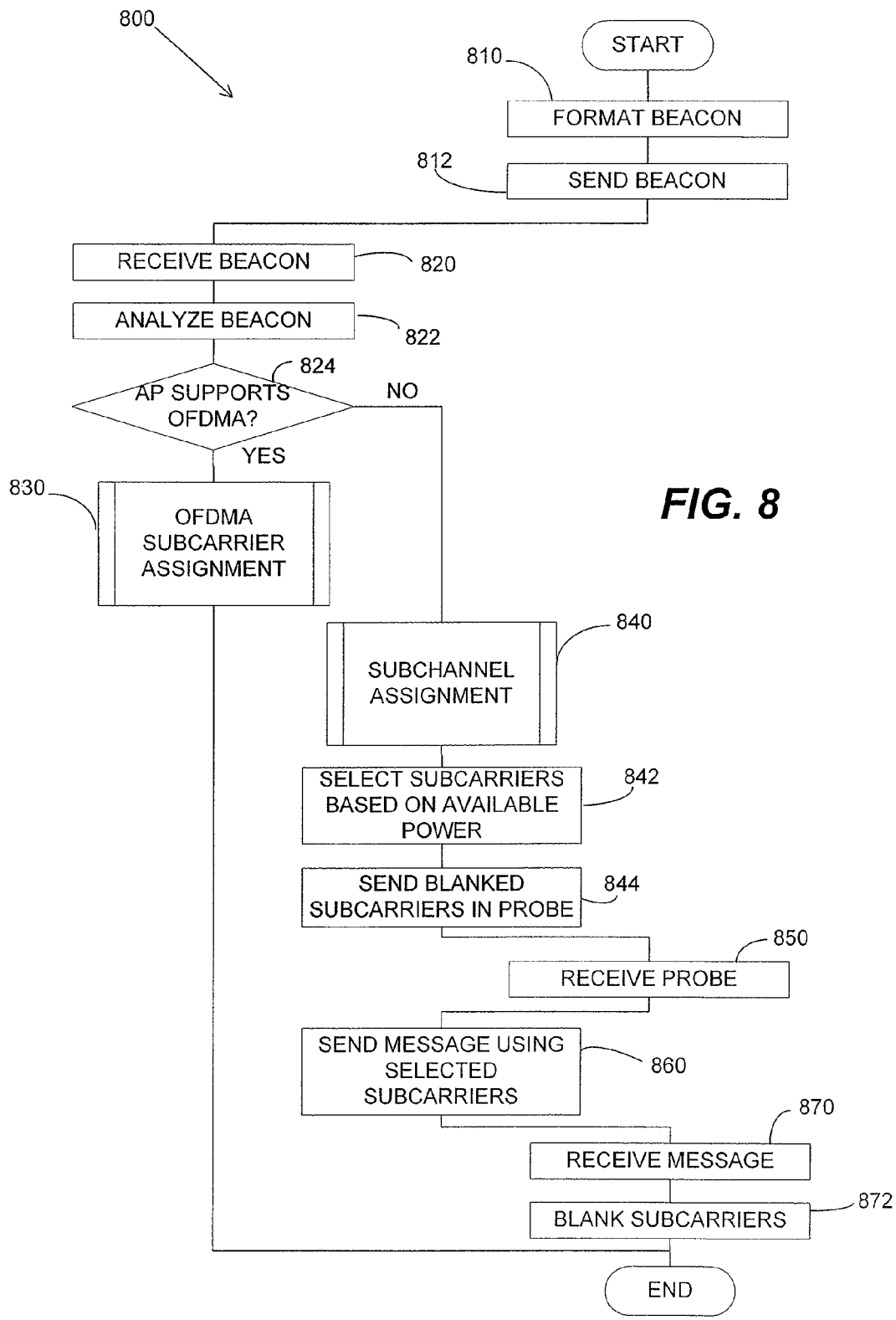
FIG. 8 is a flowchart of a communication process that is contingent on whether two devices communicating according to the process support OFDMA.

FIG. 8 illustrates a further process 800 that may be performed by devices communicating according to embodiments of the invention. Process 800 may be performed by devices operating according to embodiments of the invention in which both OFDMA-capable and non-OFDMA-capable devices interact within a cell.

Process 800 begins at block 810 where a device that generates subcarrier assignments formats a beacon. In this example, the device formatting a beacon at block 810 may be access point 122 (FIG. 1). However, the processing illustrated in FIG. 8 may be performed by any suitable device.

As part of formatting the beacon at block 810, access point 122 may generate an information element indicating whether the device is OFDMA-capable. Any suitable mechanism may be used to indicate such a capability. As one example, a bit set in an information element transmitted in conjunction with the beacon may be used to signify that the device is OFDMA-capable. Accordingly, formatting a beacon at block 810 may entail including an information element with such a bit set in the beacon.

Regardless of the specific formatting used, the process may proceed to block 812. At block 812, access point 122 may transmit the beacon, including the information element. The beacon may be transmitted using circuitry and techniques as are known in the art. However, any suitable mechanism may be used for processing at block 812.

Process 800 continues to block 820 where the transmitted beacon is received by a device. The beacon may be received by any device within cell 100. In embodiments in which the beacon is transmitted using known hardware and techniques, the beacon may be received at block 820 also using known hardware and techniques. However, as with processing at block 812, processing at block 820 may be performed in any suitable way.

Once received, the beacon may be analyzed to extract subcarrier use information. Analysis at block 822 may include extracting from the beacon information elements relating to subcarrier use. A tag, type code or other suitable identifier may be incorporated into information elements to indicate that the information elements relate to subcarrier usage. Additionally, each information element may include an address or other code to identify which devices are intended to process the usage information in the information element. In the example illustrated in FIG. 8 in which a beacon carries an information element containing information about the capabilities of the access point, that information element may be intended for all devices within cell 100. Accordingly, an address or other code in the information element may indicate that it is a broadcast type message, intended for any device receiving it. In contrast, a request for a subcarrier assignment, such as described in connection with blocks 610 (FIG. 6) or block 710 (FIG. 7), may be intended only for access point 122. In those information elements, an address or other suitable code may be included indicating that the information elements convey information to be processed by access point 122 or other suitable device making a subcarrier assignment.

Regardless of the specific encoding of information within the beacon, the process may continue to decision block 824 after the beacon is analyzed. At decision block 824, process 800 may branch depending on whether the information received in the beacon indicates that access point 122 is OFDMA-capable. If access point 122 is OFDMA-capable, the process may proceed to subprocess 830. At subprocess 830, a subcarrier assignment may be made by access point 122 to the device. Subprocess 830 may entail a process, such as processes 600 (FIG. 6) or 700 (FIG. 7) during which the device bequests and receives a subcarrier assignment that is orthogonal to the subcarrier assignments made to other devices within cell 100. However, once the device determines that access point 122 is OFDMA-capable, any suitable communication process may be performed.

Conversely, if processing at decision block 824 determines that access point 122 is not OFDMA-capable, process 800 may branch from decision block 824 to subprocess 840. At subprocess 840, a sub-channel may be assigned to the device. Any suitable mechanism may be used to assign a sub-channel, and the specific processing performed as part of subprocess 840 may depend on the capabilities of access point 122 and the device interfacing to it. For example, a sub-channel assignment may be based on an express request issued by the device. Alternatively, a sub-channel assignment may be inherent in use of a protocol supported by access point 122. Accordingly, subprocess 840 may result in a device and an access point both arising at a sub-channel in any suitable way.

The identified sub-channel may contain multiple subcarriers. In the embodiment illustrated, the device is battery powered and therefore may have limited available power. In such a scenario, it may be desirable to reduce the amount of power used by the client device in communicating with access point 122. Such a power reduction may be achieved by communicating with access point 122 using a subset containing less than all of the subcarriers in the assigned sub-channel. Though, the client device may benefit from communication over less than all of the assigned subcarriers for other reasons. For example, the client device may execute an application that requires transmission of relatively small amounts of data with relatively low latency. In this scenario or in other scenarios in which communication parameters in a link between the client device and access point 122 may be shaped by using a smaller number of sub-channels, the client device may select a subset of the subcarriers in the assigned sub-channel based on processing at block 842.

In some embodiments, using only a subset of the assigned subcarriers may result in access point 122 responding as if a communication error had occurred. Specifically, error correction and detection components within access point 122, upon finding no data within the non-selected subcarriers, may interpret the lack of information as being caused by a communication error. To prevent valid communications from being classified as erroneous, processing block 844 may communicate to access point 122 which subcarriers in the assigned sub-channel are not selected. Such information may be communicated by sending a list of selected subcarriers. Conversely, the same information may be communicated by sending a list of "blank" subcarriers, i.e., those subcarriers that are not being used. However, the information on selected subcarriers may be represented in any suitable way.

Regardless of how the information of blank subcarriers is represented, it may be transmitted to access point 122. In the example of FIG. 8, information on blank subcarriers represents a type of subcarrier usage information. Accordingly, information on blank subcarriers may be transmitted in an information element contained within a control message. In this example, processing at block 844 results in the generation of an information element that is included in a probe message directed to access point 122. In contrast to the information element received and analyzed at blocks 820 and 822, the information element in the probe message may contain an address or other identifier indicating that it is specifically directed for access point 122 or other device to receive communications from the client device.

Regardless of how the information on blank subcarriers is represented, that information may be received by access point 122 as part of processing within block 850. In this example, processing at block 850 entails access point 122 receiving the probe message and extracting the information element. Upon analysis of the information element, access point 122 may determine the identity of the client device that generated the information element and the specific subcarriers to be blanked by that device. At block 850, access point 122 may store that information for later use in conjunction with processing communications from the client device.

The process then proceeds to block 860 where the client device transmits using the selected subcarriers. In the example of FIG. 8, the client device is OFDMA-capable. Accordingly, the client device may include conventional hardware and other components capable of transmitting over selected subcarriers.

Regardless of how messages are transmitted at block 860, at block 870, access point 122 may receive the messages. Processing at block 870 may entail use of hardware and other conventional components. However, because access point 122 is not OFDMA-capable, access point 122 may decode all of the subcarriers assigned as part of subprocess 840. To account of the fact that the client device did not transmit in all of the assigned subcarriers, further processing may be performed within access point 122. At block 872, the access point 122 may blank the non-selected subcarriers. In this way, error correction and/or error detection processing that occurs following decoding of information in the assigned subcarriers will not erroneously signal an error because no information was detected in the blanked sub-channels.

Figure 9:
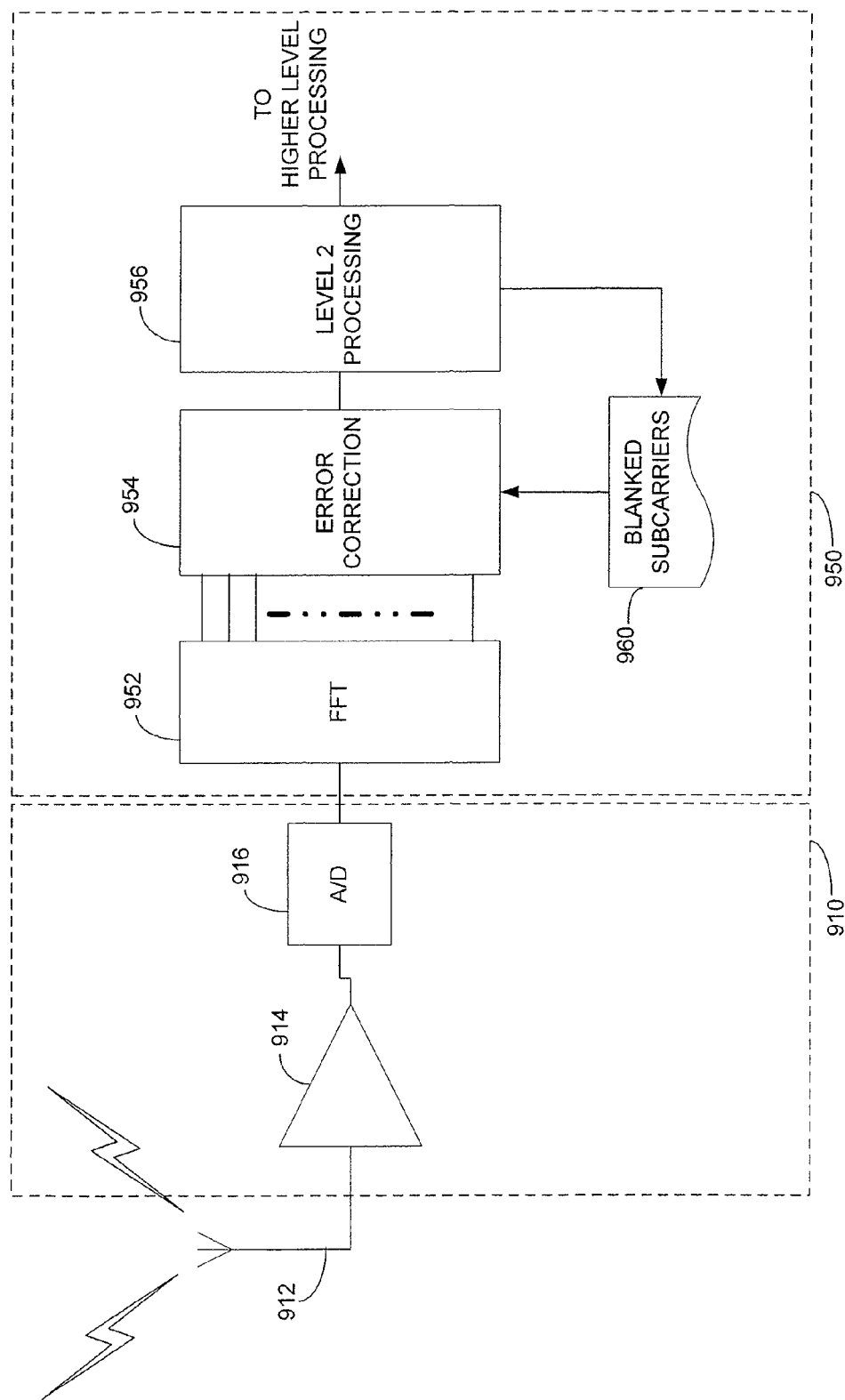
FIG. 9 is a sketch of portions of a computer system wirelessly communicating according to embodiments of the invention.

Reception and blanking of select subcarriers may be performed in any suitable way. FIG. 9 illustrates an exemplary implementation of access point 122 that may perform blanking.

FIG. 9 illustrates portions of access point 122, which, in this example, is a non-OFDMA-capable device adapted for use in conjunction with client devices communicating with blank subcarriers. FIG. 9 illustrates hardware and software components that may form a portion of a computing device configured for wireless communication. In this example, FIG. 9 illustrates hardware components 910 and software components 950. The hardware components may be a portion of a Network Interface Card (NIC). The software components may form a portion of a driver for the NIC or may form a portion of a communication stack within the operating system of a computing device configured for wireless communication. However, some or all of the functions illustrated as being performed by software components 950 may alternatively or additionally be performed within hardware elements, such as a digital signal processor, a programmable gate array or an application specific integrated circuit. Such components may be located on the NIC or in any other suitable location.

In this example, the components illustrated in FIG. 9 represents components of a wireless access point that is not constructed to be OFDMA-capable. However, the device has been modified to allow it to communicate with a client device that that blanks a subset of its assigned subcarriers.

In this example, hardware components 910 may be conventional hardware components as known in the art for incorporation into a network interface card. As illustrated, receiver 914 detects wireless signals in a frequency range corresponding to at least the sub-channel assigned to a client device with which the access point is communicating. Such radio frequency signals may be received through antenna 912 and coupled to receiver 914.

The output of receiver 914 is coupled to analog digital converter 916. One or more intermediate processing stages may be coupled between the receiver 914 and antenna 912 and between the receiver 914 and analog to digital converter 916. Such processing stages may be processing stages as are known in the art. However, any suitable processing may be performed within hardware elements 910.

Regardless of the processing performed on the signal applied as an input to analog to digital converter 916, analog to digital converter 916 translates the detected signal into a stream of digital values. In the example of FIG. 9, the stream of digital values is passed to software components 950 for further processing.

Within software components 950, a frequency domain representation of the stream of digital values may be computed. In this example, the frequency domain representation is computed through a mathematical operation sometimes called a Fast Fourier Transform (FFT). The output of such an operation is, for a stream of input digital values representing a received signal during a window in time, coefficients representing the magnitude of the frequency components in the received signal in discrete frequency ranges during that window of time. By appropriately configuring the parameters of FFT component 952, the frequency components represented by the output values may correspond to subcarriers in a communication channel. Thus, each output of FFT component 952 may represent a signal level in a subcarrier.

The output of FFT component 952 may be coupled to error correction component 954. Error correction component 954 may be a component as is known in the art for detecting and correcting errors in wireless communications. Error correction component 954 may analyze the values received in subcarriers corresponding to a sub-channel in use to detect values indicating a received signal that does not correspond to an allowed communication state. When error correction coding is used on a transmitted signal, as is known in the art, error correction component 954 may, upon detecting an improper state, determine the most likely allowed signal state that was transmitted to give rise to the detected improper operating state. In this way, error correction component 954 may detect and correct errors in received signals.

However, in scenarios in which one or more subcarriers have been blanked by a transmitting device, error correction component 954 may interpret received signals without information in the blanked subcarriers as corresponding to improper states and attempt to match those signals to proper signal states or reject them as uncorrectable. To prevent proper signals with blanked subcarriers from being rejected, error correction component may be modified from a conventional error correcting component. In this example, error correction component 954 receives as an input a list of blanked subcarriers 960. Error correction component 954 may use this list 960 of blanked subcarriers to ignore the blanked subcarriers in determining whether an improper operating state has occurred. In this way, a device, even though not OFDMA-capable, may communicate with a device that uses its OFDMA capabilities to transmit over a subset of assigned subcarriers.

In the example of FIG. 9, list 960 of blanked subcarriers is derived from an information element received in a control communication. Such control communications may be detected as part of level 2 processing of network communication. In the example of FIG. 9, level 2 processing is performed within level 2 processing component 956. Because level 2 processing is a function known in the art, level 2 processing component 956 may be implemented using known software and/or other components. Level 2 protocols accepting information elements as described above are also known. Accordingly, level 2 processing component 956 need not \perform any express processing on the subcarrier usage information. Rather, as is known conventionally, level 2 processing component 956 may simply provide as an output to other components information elements received in level 2 control messages.

Any suitable component within access point 122 may receive such an information element, identify the information element as a list of blanked subcarriers and provide it to error correction component 954. Because, in the embodiments illustrated, control communications are transmitted using base rates that are not modified by the selection of subcarriers, error correction component 954 may properly process a control message conveying an information element with a list of blanked subcarriers. Accordingly, even though error correction component 954 is not initially configured to pass communications in which subcarriers have been blanked, level 2 processing component 956 can receive level 2 communications containing information elements that are used to configure error correction component 954.

Once error correction component 954 is configured, other communications sent with blanked subcarriers may be properly received and passed to level 2 process component 956. Data communications and other higher level messages may then be passed through level 2 processing component 956 to higher level processing components (not illustrated). Such higher level processing components may be components as in known wireless network devices or any other suitable components.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a wireless access point to exchange data with a plurality of devices, the data being exchanged wirelessly over a frequency range having a plurality of subcarriers, the method comprising:
   sensing activity in at least a portion of a plurality of subcarriers, the sensing comprising, for each subcarrier in the portion:
      at a first time, detecting whether a signal is being transmitted over the subcarrier; and
      when a signal is detected at the first time, waiting a random interval and detecting whether a signal is being transmitted over the subcarrier;
   generating a plurality of subcarrier assignments, each subcarrier assignment indicating a plurality of subcarriers and each of the subcarrier assignments being associated with a device of the plurality of devices, and each of the subcarrier assignments being selected based at least in part on whether a signal being transmitted was detected in a subcarrier of the plurality of subcarriers, and the subcarrier assignments of the plurality of subcarrier assignments being selected to distinguish communications with each of the plurality of devices from communications with others of the plurality of devices;
   sending each of the plurality of subcarrier assignments to the associated device of the plurality of devices that is configured for selecting a portion of the sent subcarrier assignment; and
   communicating with the associated device using the portion of the sent subcarrier assignment where correction error processing of further communications is modified at the wireless access point so that lack of information in subcarriers that are not in the portion of the sent subcarrier assignment will not be interpreted as an error.

2. The method of claim 1, wherein:
   sending each of the subcarrier assignments comprises sending the subcarrier assignment in an information element embedded in a control communication from the access point.

3. The method of claim 2, further comprising, prior to generating a subcarrier assignment associated with a device, receiving from the device a request indicating a number of subcarriers.

4. The method of claim 3, wherein:
   the subcarrier assignment associated with the device assigns a number of subcarriers; and generating the subcarrier assignment comprises selecting the number of subcarriers based at least in part on the number of subcarriers indicated in the request received from the device.

5. The method of claim 4, wherein:
the device is a first device of the plurality of devices and the subcarrier assignment is a first subcarrier assignment, and the first device executes a first application;
the method further comprises:
receiving from a second device of the plurality of devices a second request indicating a second number of subcarriers prior to generating a second subcarrier assignment, the second subcarrier assignment being associated with the second device, and the second device executing a second application;
transmitting data from the first application in datagrams transmitted in subcarriers in the first subcarrier assignment; and
transmitting data from a second application in datagrams transmitted in subcarriers in the second subcarrier assignment, the datagrams containing data from the second application containing fewer bits than the datagrams containing data from the first application.

6. The method of claim 5, wherein the second application comprises a voice over IP application.

7. The method of claim 5, further comprising, prior to sending the second subcarrier assignment, receiving a control message comprising an information element indicating a request for a subcarrier assignment based on a type of the second application.

8. The method of claim 1, wherein generating a plurality of subcarrier assignments comprises:
dynamically selecting a subset of the subcarriers for use by each device of the plurality of devices to implement Orthogonal Frequency Division Multiple Access (OFDMA) by the plurality of devices, each selected subcarrier having sensed activity below a threshold.

9. The method of claim 1, wherein generating a plurality of subcarrier assignments comprises:
assigning, for each device of the plurality of devices, a predefined subset of the plurality of channels, each selected predefined group consisting essentially of subcarriers having sensed activity below a threshold.

10. A computer storage device storing computer-executable instructions that, when executed by a computer adapted to communicate over a wireless network through an access point, cause the computer to perform a method comprising:
identifying a subcarrier requirement based on at least one application program installed on the computer;
negotiating a subcarrier assignment with the access point, the subcarrier assignment comprising an identification of a subset of a plurality of subcarriers of a wireless communication frequency range used by the wireless network, the negotiating comprising:
formatting an information element representing the subcarrier requirement;
communicating, to the access point, the information element in a first control communication, the first control communication being in a format of a protocol of the wireless network; and
receiving, from the access point, information defining the subcarrier assignment in at least a second control communication in the format of the protocol of the wireless network;
selecting a subset of the subcarrier assignment; and
wirelessly transmitting a communication over the wireless network using the subset of the subcarrier assignment, where the communication is configured for causing modified error correction processing of further communications received at the access point so that lack of information in subcarriers that are not in the subset of the subcarrier assignment will not be interpreted as an error.

11. The computer storage device of claim 10, wherein:
the computer storage medium further comprises computer-executable instructions for, when executed, performing steps, comprising receiving from the application program an indication of a bandwidth requirement, and
identifying a subcarrier requirement comprises identifying a subcarrier requirement based at least in part on the indication of the bandwidth requirement.

12. A method of operating a device to communicate wirelessly through an access point, the method comprising:
receiving a control communication from the access point;
determining whether an information element contained in the control communication indicates that the access point is capable of performing OFDMA; and
when the access point is not indicated to be capable of performing OFDMA:
selecting a portion of a plurality of subcarriers assigned to the device;
wirelessly communicating the selected portion to the access point; and
sending a second communication to the access point using the selected portion of the subcarriers where the sent second communication is configured for causing modified error correction processing at the access point so that lack of information in subcarriers that are not in the portion will not be interpreted as an error.

13. The method of claim 12, further comprising:
when the access point is indicated to be capable of performing OFDMA:
receiving an identification of a plurality of subcarriers in a control communication from the access point; and
sending communications through the access point using the plurality of the subcarriers.

14. The method of claim 13, wherein receiving the control communication comprises receiving a beacon formatted in accordance with a Wi-Fi protocol or WiMAX protocol.

15. The method of claim 14, wherein receiving the identification of the plurality of subcarriers comprises receiving the identification in the beacon.

16. The method of claim 15, wherein selecting the portion of the plurality of subcarriers comprises selecting a number of subcarriers based on an available power level of the device.

17. The method of claim 16, wherein communicating the selected portion to the access point comprises communicating the selected portion in an information element in a control communication.

18. The method of claim 12, wherein modifying error correction processing comprises altering operation of software that performs a cyclic redundancy check.

19. The method of claim 1, wherein:
sending each of the plurality of subcarrier assignments to the associated device of the plurality of devices comprises sending the assignment in a control communication formatted in accordance with a Wi-Fi or WiMax protocol.

* * * * *